(12) United States Patent
Jenks et al.

(10) Patent No.: US 12,032,978 B2
(45) Date of Patent: Jul. 9, 2024

(54) MULTI-ACTIVE BROWSER APPLICATION

(71) Applicant: Hiperwall, Inc., Irvine, CA (US)

(72) Inventors: Stephen F. Jenks, Laguna Beach, CA (US); Duy Lai, Lake Forest, CA (US); Sung-Jin Kim, Irvine, CA (US)

(73) Assignee: Hiperwall, Inc., Irvine, CA (US)

( * ) Notice: Subject to any disclaimer, the term of this patent is extended or adjusted under 35 U.S.C. 154(b) by 0 days.

(21) Appl. No.: 17/981,748

(22) Filed: Nov. 7, 2022

(65) Prior Publication Data

US 2023/0129492 A1 Apr. 27, 2023

Related U.S. Application Data

(63) Continuation of application No. 17/011,863, filed on Sep. 3, 2020, now Pat. No. 11,494,209.

(60) Provisional application No. 62/895,767, filed on Sep. 4, 2019.

(51) Int. Cl.
*G06F 9/455* (2018.01)
*G06F 3/14* (2006.01)

(52) U.S. Cl.
CPC ........ *G06F 9/45529* (2013.01); *G06F 3/1446* (2013.01)

(58) Field of Classification Search
CPC .................. G06F 9/45529; G06F 3/1446
See application file for complete search history.

(56) References Cited

U.S. PATENT DOCUMENTS

| | | | |
|---|---|---|---|
| 5,841,418 A | 11/1998 | Bril et al. | |
| 7,921,372 B2 | 4/2011 | Sauve et al. | |
| 8,797,233 B2 | 8/2014 | Jenks et al. | |
| 8,972,884 B2 | 3/2015 | Li et al. | |
| 9,092,184 B2 | 7/2015 | Buchner | |
| 9,691,356 B2 | 6/2017 | Biggs et al. | |
| 9,817,627 B2 | 11/2017 | Kreiner et al. | |
| 10,387,546 B1* | 8/2019 | Duran | G06F 40/30 |
| 10,540,135 B1* | 1/2020 | Fitzgerald | H04N 23/698 |
| 2002/0116539 A1 | 8/2002 | Bryczkowski et al. | |
| 2008/0301562 A1 | 12/2008 | Berger et al. | |
| 2009/0024953 A1 | 1/2009 | Selig | |
| 2013/0111368 A1 | 5/2013 | Laughlin | |
| 2013/0311930 A1* | 11/2013 | Sauve | G06F 9/451 715/777 |

(Continued)

OTHER PUBLICATIONS

Peter J. Shin, Tab-resize, http://peterdotjs.com/tab-resize/, retrieved on Jun. 20, 2018.

*Primary Examiner* — Azizul Choudhury
(74) *Attorney, Agent, or Firm* — Knobbe, Martens, Olson & Bear, LLP

(57) ABSTRACT

An improved browser application that provides a view with the option of displaying simultaneously content of a plurality of "tabs" of the browser application on one or more displays, regardless of whether the tabs are active or inactive, is described herein. For example, the browser application can display simultaneously the content of multiple tabs and allow a user to resize and reposition the content of any one tab independent of the size, position, or number of other displayed tab content. Thus, in some circumstances, the content of one tab can partially or fully overlap (and therefore partially or fully hide) the content of another tab after a user manipulation of the size or position of tab content.

19 Claims, 10 Drawing Sheets

(56) References Cited

U.S. PATENT DOCUMENTS

2014/0365854 A1    12/2014  Karunamuni et al.
2015/0220300 A1     8/2015  Reynaga et al.
2016/0188138 A1     6/2016  Chen et al.
2017/0199638 A1     7/2017  Bhupatiraju et al.
2017/0272830 A1*    9/2017  Richman ............ H04N 21/4821

* cited by examiner

MULTI-ACTIVE BROWSER APPLICATION

CROSS-REFERENCE TO RELATED APPLICATIONS

This application is a continuation of U.S. patent application Ser. No. 17/011,863, entitled "MULTI-ACTIVE BROWSER APPLICATION" and filed on Sep. 3, 2020, which claims the benefit of priority under 35 U.S.C. § 119(e) of U.S. Provisional Patent Application No. 62/895,767, entitled "MULTI-ACTIVE BROWSER APPLICATION" and filed on Sep. 4, 2019, which are hereby incorporated by reference herein in their entireties.

BACKGROUND

Traditionally, personal computers and workstations are connected to one or a small number of adjacent display devices, often liquid crystal display (LCD) type monitors. Such systems can provide the user with the ability to view a larger number of pixels than what is typically displayable on a single monitor.

Commercially available computer systems can often support one or two monitors for each video controller (sometimes constructed in the form of a "video card") connected to the system. For example, typical computer systems include several expansion slots which can accept certain types of video cards. Motherboards of some computer systems are built with one or more peripheral component interconnect (PCI), PCI Express, accelerated graphics port (AGP), etc., slots that can accept video cards. In this manner, a single computer system can include multiple video cards to increase the number of displays that can be controlled by the computer system.

SUMMARY

An aspect of at least one of the embodiments disclosed herein includes the realization that, although a single computer system (a computer system controlled by a single "motherboard" which may have one or more processors) can be connected with an array of display devices, the processing core of such a computer system can become a choke point which ultimately limits the performance and thus the practicability of creating and controlling video images on tiled arrays formed of a large number of individual display devices disposed adjacent one another. Thus, in some of the embodiments disclosed herein, each display device or "node" in a tiled array display can include a network communication device configured to allow the node to receive image data from a video image data source without all of the video image data for the entire array passing through a single computer.

Thus, in accordance with an embodiment, described herein is an improved browser application (also referred to herein as a "multi-active browser application") that provides a view with the option of displaying simultaneously content of a plurality of "tabs" of the multi-active browser application, which can be active or inactive. For example, the multi-active browser application can display simultaneously or concurrently the content of multiple tabs and allow a user to resize and reposition (e.g., move, rotate, flip, etc.) the content of any one tab independent of the size, position, or number of other displayed tab content. As an illustrative example, the multi-active browser application can display simultaneously or concurrently the content of multiple tabs within a single window, where the content of a particular tab can optionally have a border or other type of boundary to distinguish the content of one tab from the content of another tab. A user can resize the content of one tab to a larger or smaller size and can move or drag the tab content to another position within the single window. In particular, the resizing or repositioning of the tab content can be independent of the size, position, or number of other tab content present within the single window (e.g., how tab content is resized or repositioned is not dependent on the size, position, or number of other tab content present within the single window, and resizing or repositioning tab content does not affect the size or position of other tab content present within the single window). Thus, in some circumstances, the content of one tab can partially or fully overlap (and therefore partially or fully hide) the content of another tab after a user manipulation of the size or position of tab content.

Furthermore, the tab content displayed within the single window of the multi-active browser application can be dynamic such that any dynamically-changing content depicted therein does not remain static. For example, for any tab that includes dynamically-changing content and the content of which is depicted in the single window, the multi-active browser application can play or show the dynamically-changing content. Thus, the multi-active browser application can play or show simultaneously or concurrently the content of multiple tabs visible in the single window.

Another aspect of at least one of the embodiments described herein includes the realization that the multi-active browser application is able to seamlessly display content of multiple tabs in a manner that enhances the user experience of multi-display systems. For example, a computer system running the multi-active browser application can control multiple displays. The multiple displays can include a primary display and one or more secondary displays. The computer system can be configured to display the multi-active browser application on the primary display. The multi-active browser application can include tab functionality. Thus, the primary display can depict the content of a selected tab. However, the multi-active browser application can provide a user with an option to display simultaneously the content of any open tab on one or more of the secondary displays, regardless of whether a tab is selected or unselected. Thus, content associated with unselected tabs (also referred to herein as "inactive tabs") can be hidden from view in the primary display. Such content, however, can be visible on one or more of the secondary displays different than the primary display.

These content pages can be visible at a native or original size—rather than the size of a thumbnail, snapshot, or other preview—on one or more of the secondary displays. These content pages associated with unselected tabs also are not simply displayed as static images or snapshots. Rather, the content pages visible on the secondary display(s) can depict content that dynamically updates, if appropriate. For example, if a content page depicts an animation or video, the animation or video can continue to play while the content page is visible on a secondary display. Thus, the multi-active browser application can cause the content of multiple tabs to be displayed simultaneously or concurrently, and can cause the dynamically-changing content of multiple tabs to play or show simultaneously or concurrently.

One aspect of the disclosure provides a computer-implemented method comprising: receiving, by a user device, a first request to open a first tab in a browser application running on the user device; causing a display coupled to the user device to display content of the first tab; receiving, by the user device, a second request to open a second tab in the browser application; causing the display to display content of the second tab simultaneously with the content of the first tab, the content of the second tab displayed at a first size and at a first position; and in response to reception of an instruction to modify an appearance of the content of the first tab, modifying the appearance of the content of the first tab in accordance with the instruction and independent of a size or position of the content of the second tab, and causing the display to display concurrently the content of the first tab with the modified appearance and the content of the second tab at the first size and at the first position.

The computer-implemented method of the preceding paragraph can include any sub-combination of the following features: where the content of the first tab with the modified appearance comprises at least one of a resized version of the content of the first tab or a repositioned version of the content of the first tab; where the content of the first tab with the modified appearance at least partially overlaps the content of the second tab at the first size and at the first position; where the display displays a dynamic version of the content of the first tab concurrently with a dynamic version of the content of the second tab; where the browser application is displayed on a primary display coupled to the user device; where the computer-implemented method further comprises causing, by the user device, a second display to display at least a portion of the content of the second tab concurrently with the display displaying concurrently the content of the first tab with the modified appearance and the content of the second tab at the first size and at the first position; where the display and the second display are positioned adjacent to each other in a video wall; where the display is positioned within a first room, and where the second display is positioned within a second room different than the first room; where the primary display, the display, and the second display are physically connected to the user device; where the first tab is active in the browser application such that the content of the first tab is visible in the primary display, and where the second tab is inactive in the browser application such that the content of the second tab is hidden from view in the primary display; where the computer-implemented method further comprises receiving, by the user device, an instruction to display content of a third tab open in the browser application on a second display, where the third tab is inactive in the browser application such that the content of the third tab is hidden from view in the primary display, and causing, by the user device, the second display to display the content of the third tab concurrently with the display displaying concurrently the content of the first tab with the modified appearance and the content of the second tab at the first size and at the first position; where the computer-implemented method further comprises in response to reception of a second instruction to move at least a portion of the content of the third tab from the second display to the display, moving the content of the third tab in accordance with the second instruction and independent of a size or position of the content of the first tab and a size or position of the content of the second tab, and causing the display to display concurrently the content of the first tab with the modified appearance, the content of the second tab at the first size and at the first position, and at least the portion of the content of the third tab; and where the browser application displayed in the primary display comprises a selectable element corresponding to the first tab and a selectable element corresponding to the second tab, and where the display does not display the selectable element corresponding to the first tab.

Another aspect of the disclosure provides a system comprising a display. The system further comprises a control node comprising a processor and computer-executable instructions, where the computer-executable instructions, when executed, cause the control node to: execute a browser application; process a first request to open a first tab in the browser application; cause the display to display content of the first tab; process a second request to open a second tab in the browser application; cause the display to display content of the second tab simultaneously with the content of the first tab, the content of the second tab displayed at a first size and at a first position; and in response to reception of an instruction to modify an appearance of the content of the first tab, modify the appearance of the content of the first tab in accordance with the instruction and independent of a size or position of the content of the second tab, and cause the display to display concurrently the content of the first tab with the modified appearance and the content of the second tab at the first size and at the first position.

The system of the preceding paragraph can include any sub-combination of the following features: where the content of the first tab with the modified appearance comprises at least one of a resized version of the content of the first tab or a repositioned version of the content of the first tab; where the content of the first tab with the modified appearance at least partially overlaps the content of the second tab at the first size and at the first position; where the display displays a dynamic version of the content of the first tab concurrently with a dynamic version of the content of the second tab; where the control node comprises a primary display, and where the browser application is displayed on the primary display; where the system further comprises a second display, and where the computer-executable instructions, when executed, further cause the control node to cause the second display to display at least a portion of the content of the second tab concurrently with the display displaying concurrently the content of the first tab with the modified appearance and the content of the second tab at the first size and at the first position; and where he display and the second display are positioned contiguous to each other in a tiled display system.

Another aspect of the disclosure provides non-transitory, computer-readable storage media comprising computer-executable instructions, where the computer-executable instructions, when executed by a control node comprising physical hardware, cause the control node to perform operations comprising: executing a browser application, where the browser application comprises a first tab and a second tab; causing a display to display content of the first tab concurrently with content of the second tab, the content of the second tab displayed at a first size and at a first position; and in response to reception of an instruction to modify an appearance of the content of the first tab, modifying the appearance of the content of the first tab in accordance with the instruction and independent of a size or position of the content of the second tab, and causing the display to display concurrently the content of the first tab with the modified appearance and the content of the second tab at the first size and at the first position.

BRIEF DESCRIPTION OF DRAWINGS

Throughout the drawings, reference numbers can be reused to indicate correspondence between referenced elements. The drawings are provided to illustrate example embodiments described herein and are not intended to limit the scope of the disclosure.

DETAILED DESCRIPTION

Figure 1A:
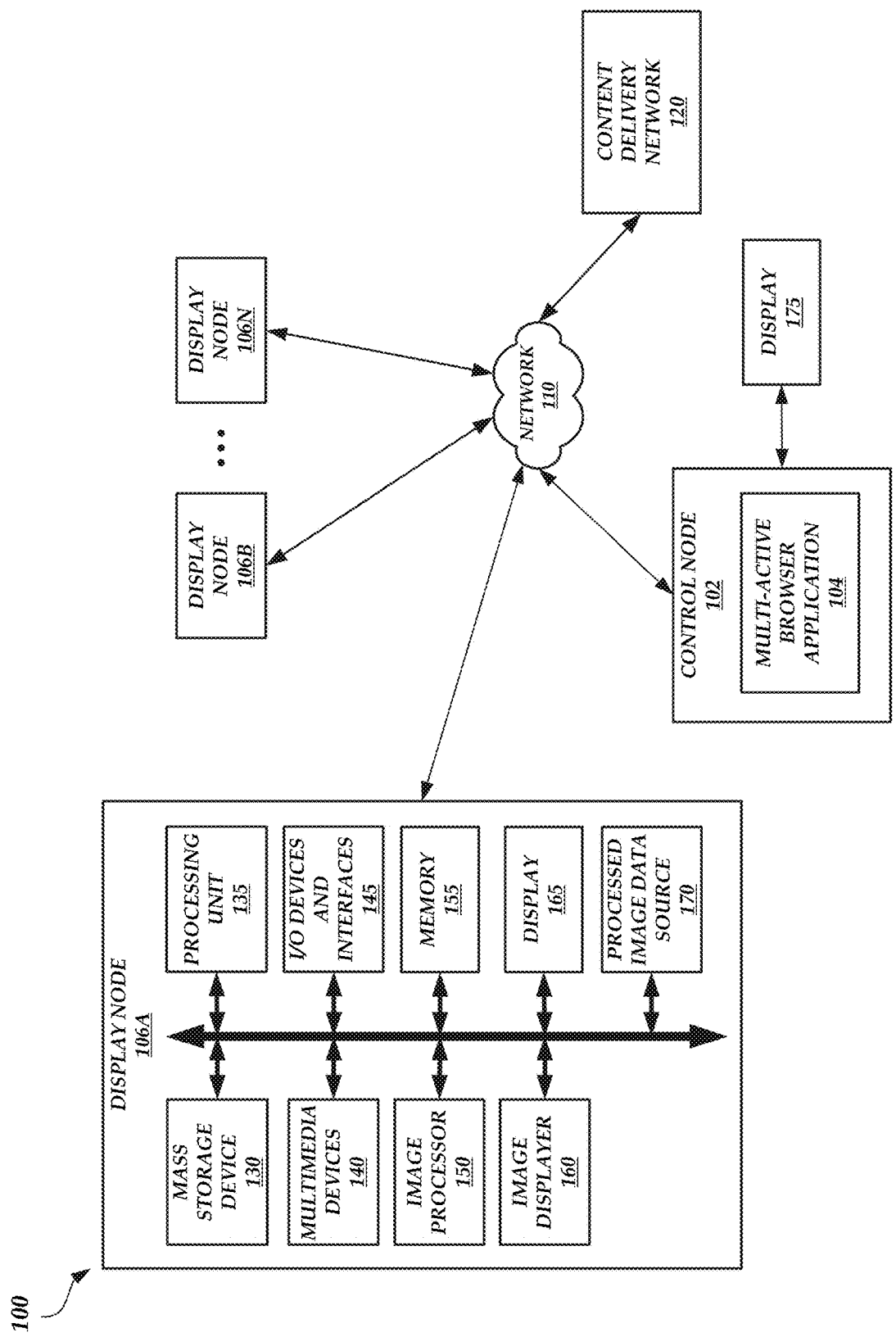
FIG. 1A is a block diagram illustrating an exemplary multi-active browsing environment in which a plurality of display nodes are in communication with a network and other devices via the network, including an optional control node.

In some embodiments, a single computer system can include multiple video cards to increase the number of displays that can be controlled by the computer system. The computer system can logically arrange the controlled displays such that the displays collectively depict windows, icons, and/or other items in a shared viewing space. The shared viewing space, therefore, can be an aggregation of each display's screen space. Each display can depict windows, icons, and/or other items (collectively referred to herein as "objects") positioned in a portion of the shared viewing space associated with the respective display. The computer system can allow a user to drag an object within the shared viewing space so that one display depicts the object instead of another display. The computer system can also allow a user to open multiple objects positioned in different places within the shared viewing space so that one display depicts some objects and another display depicts other objects simultaneously.

As an illustrative example, a user can open a browser application to view a content page (e.g., a network page, a web page, etc.). Initially, the content page can be depicted within a single window of the browser application, and the single window can be positioned within the shared viewing space associated with a first display. If the user would like to view two content pages simultaneously, the user can open a second window of the browser application and move the second window to a portion of the shared viewing space associated with a second display. The user can repeat this process to view additional content pages simultaneously with the first two content pages.

The functionality described above can be practical in situations in which an unlimited amount of shared viewing space is available. In typical situations, however, the shared viewing space is limited. A user may wish to view multiple windows simultaneously, but the size of the shared viewing space may not be large enough for all of the windows to be depicted simultaneously at a viewable size. A user may have to decide which windows to view simultaneously and which windows should be minimized or closed for viewing at another time.

Some browser applications allow users to consolidate windows depicting different content pages into tabs depicted in a single window to conserve the shared viewing space. Such browser applications can be referred to as tabbed browser applications. While tabbed browser applications consolidate windows depicting different content pages into a single window, such tabbed browser applications require users to perform additional navigational steps to view desired content on non-active (e.g., inactive) tabs. For example, a user can initially view a first content page in the browser application window. Instead of opening a new browser application window to view a second content page, the user can open a tab in the initial browser application window. The browser application window can then display two tabs, where the first tab corresponds to the first content page and the second tab corresponds to the second content page.

Selection of a tab causes the browser application window to depict the content page corresponding to the selected tab. Thus, selection of the first tab would cause the browser application window to depict the first content page. However, the browser application will hide content pages corresponding to unselected tabs. Thus, selection of the first tab would result in the second tab's content page not being visible to the user.

Some browser applications allow users to view simultaneously the content of multiple tabs. For example, a user can select a button that causes a browser application to display simultaneously thumbnails or snapshots of the content of multiple tabs. However, the ability of a user to manipulate the size, location, and type of content displayed in the browser application is limited. For example, the size of such thumbnails or snapshots is smaller than the normal size of the content of a tab, and therefore it is more difficult for a user to view the content of any one tab. In fact, such a browser application does not allow a user to control the size of the thumbnails or snapshots. Rather, the size of each thumbnail or snapshot is equal and is dependent on the number of tabs that are open in the browser application. In particular, the higher the number of tabs that are open in the browser application, the smaller the size of the thumbnails or snapshots.

A user can attempt to zoom into a particular thumbnail or snapshot, but this results in other thumbnails or snapshots also being zoomed in at a same percentage. Thus, zooming into one thumbnail or snapshot causes other thumbnails or snapshots to disappear from view. A user, therefore, can have trouble viewing the content of multiple tabs when zooming in to one or more thumbnails or snapshots of interest.

Not only do these browser applications restrict a user's ability to resize a thumbnail or snapshot, but also these browser applications restrict a user's ability to position the thumbnails or snapshots within the browser application. In particular, these browser applications organize thumbnails or snapshots in a tile arrangement that ultimately limits the manner in which the thumbnails or snapshots can be positioned. For example, the tile arrangement includes various tiles, and a single thumbnail or snapshot can be positioned within any given tile. Because only a single thumbnail or snapshot can be positioned within any given tile, a user moving one thumbnail or snapshot to a tile that is already occupied by another thumbnail or snapshot causes the browser application to shift the positions of other thumbnails or snapshots to accommodate the thumbnail or snapshot moved by the user. Thus, these browser applications do not allow a user to position one thumbnail or snapshot independent of the other thumbnails or snapshots.

As an illustrative example, a first thumbnail or snapshot can occupy a first tile, a second thumbnail or snapshot can occupy a second tile to the right of the first tile, and a third thumbnail or snapshot can occupy a third tile to the right of the second tile. If a user moves the third thumbnail or snapshot to the tile occupied by the first thumbnail or snapshot, the browser application would then shift the first thumbnail or snapshot to the second tile and the second thumbnail or snapshot to the third tile. These browser applications do not allow the user to, for example, move the third thumbnail or snapshot to a position other than a position that corresponds with a tile, and do not allow the user to, for example, move the third thumbnail or snapshot to the first tile without causing the positions of the first and second thumbnails or snapshots to change.

Finally, these browser applications display the thumbnails or snapshots as static images. For example, one or more tabs can include a video, an animation, a change in page content as a result of an automatic page refresh, or other dynamically-changing content. This dynamically-changing content, however, remains static (e.g., the video, animation, etc. is not played, new page content resulting from an automatic page refresh is not depicted, etc.) while multiple tabs are displayed simultaneously as thumbnails or snapshots. If a user zooms into a particular thumbnail or snapshot, these browser applications can begin to play or show the dynamically-changing content of the thumbnail or snapshot. However, as mentioned above, the user can no longer view simultaneously the content of all other tabs when zooming into one thumbnail or snapshot. In addition, these browser applications do not play or show simultaneously the dynamically-changing content of multiple thumbnails or snapshots when a user begins to zoom in to one thumbnail or snapshot. Thus, if two thumbnails or snapshots displayed adjacent to each other in the tile arrangement both include dynamically-changing content, these browser applications will only play or show the dynamically-changing content of one thumbnail or snapshot when the user begins to zoom in, even if both thumbnails or snapshots are still visible when the user begins to zoom in.

To view multiple content pages at an original size (e.g., at a 100% zoom level) and with the playback or depiction of any dynamically-changing content included within the content pages, a user would either have to select individually each tab or individually drag tabs outside the tabbed browser application window to form different windows (which would then render moot the benefit otherwise provided by having tabs). A user, therefore, may have to perform additional navigational steps (e.g., individually select different tabs, individually drag tabs outside the tabbed browser application window, etc.) to see multiple desired content pages.

Thus, in accordance with an embodiment, described herein is an improved browser application (also referred to herein as a "multi-active browser application") that provides a view with the option of displaying simultaneously content of a plurality of "tabs" of the multi-active browser application, which can be active or inactive. For example, the multi-active browser application can display simultaneously or concurrently the content of multiple tabs and allow a user to resize and reposition the content of any one tab independent of the size, position, or number of other displayed tab content. As an illustrative example, the multi-active browser application can display simultaneously or concurrently the content of multiple tabs within a single window, where the content of a particular tab can optionally have a border or other type of boundary to distinguish the content of one tab from the content of another tab. A user can resize the content of one tab to a larger or smaller size and can move or drag the tab content to another position within the single window. In particular, the resizing or repositioning of the tab content can be independent of the size, position, or number of other tab content present within the single window (e.g., how tab content is resized or repositioned is not dependent on the size, position, or number of other tab content present within the single window, and resizing or repositioning tab content does not affect the size or position of other tab content present within the single window). Thus, in some circumstances, the content of one tab can partially or fully overlap (and therefore partially or fully hide) the content of another tab after a user manipulation of the size or position of tab content.

Furthermore, the tab content displayed within the single window of the multi-active browser application can be dynamic such that any dynamically-changing content depicted therein does not remain static. For example, for any tab that includes dynamically-changing content and the content of which is depicted in the single window, the multi-active browser application can play or show the dynamically-changing content. Thus, the multi-active browser application can play or show simultaneously or concurrently the content of multiple tabs visible in the single window.

Another aspect of at least one of the embodiments described herein includes the realization that the multi-active browser application is able to seamlessly display content of multiple tabs in a manner that enhances the user experience of multi-display systems. For example, a computer system running the multi-active browser application can control multiple displays. The multiple displays can include a primary display and one or more secondary displays. The computer system can be configured to display the multi-active browser application on the primary display. The multi-active browser application can include the tab functionality described above. Thus, the primary display can depict the content page of a selected tab. However, the multi-active browser application can provide a user with an option to display simultaneously the content of any open tab on one or more of the secondary displays, regardless of whether a tab is selected or unselected. Thus, content pages associated with unselected tabs (also referred to herein as "inactive tabs") can be hidden from view in the primary display. Such content pages, however, can be visible on one or more of the secondary displays different than the primary display.

These content pages can be visible at a native or original size—rather than the size of a thumbnail, snapshot, or other preview—on one or more of the secondary displays. These content pages associated with unselected tabs also are not simply displayed as static images or snapshots. Rather, the content pages visible on the secondary display(s) can depict content that dynamically updates, if appropriate. For example, if a content page depicts an animation or video, the animation or video can continue to play while the content page is visible on a secondary display. Thus, the multi-active browser application can cause the content of multiple tabs to be displayed simultaneously or concurrently, and can cause the dynamically-changing content of multiple tabs to play or show simultaneously or concurrently.

The multi-active browser application can also allow content to be displayed in the primary display and/or the secondary display(s) at a native or original resolution, regardless of the screen resolution of the primary display and/or the secondary displays. For example, the multi-active browser application can retrieve high-resolution content (e.g., content at a resolution of 4096×2160 pixels, 7680× 4320 pixels, etc.; content having more than 1 million pixels, more than 10 million pixels, more than 100 million pixels, more than 1 billion pixels, etc.; etc.) and cause the primary display and/or one or more of the secondary displays to display the high-resolution content at the original resolution. The multi-active browser application can bypass the screen resolution limitations of the primary display and/or the secondary display(s) to provide this functionality.

The secondary displays can be individual display screens arranged in different positions and/or locations. For example, each secondary display can be placed at a different location on a table, can be secured to different positions on a monitor arm or bracket, can be placed in the same and/or different rooms, can be tiled together contiguously and/or in an overlapping manner to form a tiled display system (e.g., a video wall), etc. The multi-active browser application can provide the functionality described herein regardless of the manner in which the secondary displays are arranged.

The multi-active browser application described herein provides several technical benefits. For example, the multi-active browser application allows users to view the content of multiple tabs simultaneously within a single window or over multiple displays, regardless of whether the tabs are active or inactive. The user can resize and reposition the content of one tab independent of the size, position, or number of the content of other tabs that are visible (e.g., how tab content is resized or repositioned is not dependent on the size, position, or number of other tab content that is visible, and resizing or repositioning tab content does not affect the size or position of other tab content that is visible). The displayed content is dynamic such that any dynamically-changing content is played or shown, regardless of the amount of dynamically-changing content that is visible or the number of tabs that are simultaneously displayed. Thus, a number of navigational steps that a user is required to perform to view the content of multiple tabs, whether active or inactive, is reduced.

As an illustrative example, the multi-active browser application allows a user to consolidate different windows directed to different content pages into a single window that depicts various tabs that each correspond to a content page. This allows the user to open and view other objects within the primary display simultaneously with the multi-active browser application window.

The number of navigational steps a user performs to view content of the different tabs is reduced, however, because the user does not have to select tabs individually or individually drag tabs outside the multi-active browser application window to view the content of these tabs. Rather, the user can select one option provided by the multi-active browser application that, when enabled, causes the multi-active browser application to display simultaneously the content of multiple tabs in a single window. Alternatively or in addition, the user can select another option provided by the multi-active browser application that, when enabled, causes the computer system to transmit the content of any selected or unselected tab to one or more secondary displays for display. Thus, if the option to transmit tab content to one or more secondary displays is selected and the option to display simultaneously the content of multiple tabs in a single window is not selected, the secondary display(s) can display content of the unselected tab(s) even though the content of these tabs is not visible within the multi-active browser application window displayed on the primary display and even though the user has not performed any action to select an unselected tab or drag an unselected tab to form a new window.

Furthermore, the functionality of the multi-active browser application can reduce a number of computer systems required to be present in an environment. For example, typical computer systems allow users to clone or extend a screen to a secondary display. However, tabbed browser applications only depict one content page at a time. Thus, a computer system running a tabbed browser application can depict the content of only one tab at a time on a secondary display. Given the limitations of tabbed browser applications, multiple computer systems can be required to view the content of multiple tabs simultaneously, with each computer system running a tabbed browser application depicting a different content page and cloning or extending a screen to a separate secondary display. With the multi-active browser application, however, one computer system can be sufficient to allow a user to view the content of multiple tabs simultaneously.

Finally, the multi-active browser application can bypass or ignore the screen resolutions of the primary and/or secondary displays, allowing users to view content at an original or native format. As described above, a typical computer system can clone or extend a screen to a secondary display. The size of the content displayed by the secondary display can be limited to the defined screen resolution of the secondary display. If the typical computer system clones or extends a screen to a set of secondary displays, such as a video wall, the size of the content displayed collectively by the set of secondary displays can be limited to the collective screen resolution of the set of secondary displays (e.g., the screen resolution of the video wall). The content depicted within a browser application window, however, can have a resolution that is higher than the defined screen resolution of a secondary display or the collective screen resolution of a set of secondary displays. Nonetheless, the typical computer system can reduce the size of the content within the browser application window to the defined screen resolution of the secondary display or the collective screen resolution of the set of secondary displays. On the other hand, the multi-active browser application can cause a computer system to depict content at a native resolution on one or more secondary displays, even if the native resolution is higher than the defined screen resolution of the secondary display or the collective screen resolution of the set of secondary displays. Users can zoom into and/or out of the content within the multi-active browser application, and the secondary display(s) can continue to display the content at the content's native resolution. Thus, the multi-active browser application allows users to view high resolution content at the original size regardless of the hardware limitations of the secondary display(s).

The foregoing aspects and many of the attendant advantages of this disclosure, including the above-referenced technical benefits, will become more readily appreciated as the same become better understood by reference to the following detailed description, when taken in conjunction with the accompanying drawings.

Example Multi-Active Browsing Environment

FIG. 1A is a block diagram illustrating an exemplary multi-active browsing environment 100 in which a plurality of display nodes 106A-106N are in communication with a network 110 and other devices via the network 110, including an optional control node 102 (also referred to herein as a "primary workstation" or a "user device" in some embodiments). The control node 102 can execute a multi-active browser application 104 and be in communication with a display 175 (also referred to herein as a "primary display"). The display nodes 106A-106N can each include displays 165 that are referred to herein as "secondary displays." Visual data, such as video data, content pages (e.g., network pages, web pages, etc.), still images, etc., can be stored in any device connected to the network, including the nodes 106A-106N, the control node 102, or any other device.

While FIG. 1A depicts the display 175 as being external to the control node 102, this is not meant to be limiting. For example, the display 175 can be embedded within or otherwise comprised within the control node 102.

Generally, the control node 102 can comprise one or more computing devices that gather or make available information about the state of a tiled display system (also referred to herein as a "video wall") formed by some or all of the displays 165 of the display nodes 106A-106N through the use of messages. For example, the control node 102 can include a desktop, laptop, tablet, netbook, handheld computing device (e.g., a smartphone or PDA), a server, a smart watch, a set top box (e.g., a video gaming machine, a television receiver, a wired and/or wireless access point, etc.), and/or the like. In addition, the control node 102 can function as a front end interface to the tiled display system that allows a user to interact with the tiled display system, for example.

The control node 102 can further execute the multi-active browser application 104, which allow users to view the content of multiple tabs simultaneously, regardless of whether a tab is selected or unselected. For example, tabs can be graphical control elements that allow multiple content pages, documents, and/or other content to be contained within a single window. In particular, a tab can be associated with specific content, and selection of a tab can cause the associated content to be displayed in the single window. The tabs can serve as navigational elements that allow a user to switch between the content associated with a particular tab. The multi-active browser application 104 can depict one or more tabs within a single window. Selection of one tab can cause the tab to become active such that the multi-active browser application 104 displays content corresponding to the selected tab (e.g., a content page corresponding to the selected tab) and hides content corresponding to the other tab(s).

As used herein, a tab selected in the multi-active browser application 104 can be considered an active tab because the content of the tab is viewable. Likewise, any tabs in the multi-active browser application 104 other than the selected tab can be considered inactive tabs because the content of these tabs is not immediately viewable. However, a tab being inactive does not necessarily mean that the content associated with the tab is paused, stopped, or otherwise in a suspended state. Rather, the active or inactive status of a tab can refer to whether content associated with the tab is immediately or currently viewable in the multi-active browser application 104 window. For example, if an inactive or unselected tab is associated with video content, the video content can continue to play in the background even though the video content is not immediately viewable in the multi-active browser application 104 window. An open tab can be any tab currently open in the multi-active browser application 104, whether or not content of the tab is immediately viewable. Thus, both selected and unselected tabs are open tabs.

In an embodiment, the control node 102 causes the display 175 to display the multi-active browser application 104 window. Thus, the display 175 can depict the content of a tab selected in the multi-active browser application 104 and not depict the content of any other tabs in the multi-active browser application 104 that are unselected. Alternatively or in addition, the multi-active browser application 104 can display a thumbnail view or preview view of the content of a tab that is unselected when, for example, a user hovers a cursor over the unselected tab.

Content of a selected tab and/or content of unselected tab(s), however, can be viewable on the display 175 in response to a user selection. For example, the multi-browser application 104 provides a display option that, when selected, causes the content of some or all of the open tabs (e.g., both selected and unselected tabs) to be displayed simultaneously within a single window of the multi-active browser application 104 on the display 175. The content of a particular tab can optionally have a border or other type of boundary to distinguish the content of one tab from the content of another tab. A user can resize the content of one tab to a larger or smaller size and can move or drag the tab content to another position within the single window. In particular, the resizing or repositioning of the tab content can be independent of the size, position, or number of other tab content present within the single window (e.g., how tab content is resized or repositioned is not dependent on the size, position, or number of other tab content present within the single window, and resizing or repositioning tab content does not affect the size or position of other tab content present within the single window). Thus, in some circumstances, the content of one tab can partially or fully overlap (and therefore partially or fully hide) the content of another tab after a user manipulation of the size or position of tab content.

Furthermore, the tab content displayed within the single window of the multi-active browser application 104 can be dynamic such that any dynamically-changing content depicted within any tab does not remain static. For example, for any tab that includes dynamically-changing content and the content of which is depicted in the single window of the multi-active browser application 104, the multi-active browser application 104 can play or show the dynamically-changing content. Thus, the multi-active browser application 104 can play or show simultaneously the content of multiple tabs visible in the single window. Optionally, the multi-active browser application 104 can provide a user with an option to toggle between content of specific tabs being depicted dynamically or statically on the display 175. Possible display options are described in greater detail below with respect to FIG. 2.

Content of a selected tab and/or content of unselected tab(s) can also be viewable on one or more displays 165 of the display nodes 106A-106N (where each display node 106A-106N can include a display 165). For example, the control node 102 can cause one or more displays 165 to display content of any tab of the multi-active browser application 104. The control node 102 can cause the display(s) 165 to display content of a tab at a native or original size (e.g., rather than the size of a thumbnail, snapshot, or other type of preview), at a reduced size that is smaller than, equal to, or larger than the size of a thumbnail, snapshot, or other type of preview, and/or at an enlarged size that is larger than the native or original size of the tab content. A user can also move or drag the tab content from one position within a single display 165 to another position within the single display 165, or from one position at least partly within one display 165 to another position at least partly within another display 165. The multi-active browser application 104 provides functionality such that the resizing or repositioning of the tab content can be independent of the size, position, or number of other tab content displayed on the display(s) 165 (e.g., how tab content is resized or repositioned is not dependent on the size, position, or number of other tab content displayed on the display(s) 165, and resizing or repositioning tab content does not affect the size or position of other tab content displayed on the display(s) 165). Thus, in some circumstances, the content of one tab can partially or fully overlap (and therefore partially or fully hide) the content of another tab after a user manipulation of the size or position of tab content when the tab content is displayed on the display(s) 165.

The control node 102 can also cause the display(s) 165 to display a real-time representation of a tab (e.g., a representation in which content of a tab appears and/or updates dynamically as if the tab was active within the multi-active browser application 104, such as by playing or showing dynamically-changing content). Thus, the multi-active browser application 104 can cause the display(s) 165 to play or show simultaneously the content of multiple tabs. Optionally, the multi-active browser application 104 can provide a user with an option to toggle between content of specific tabs being depicted dynamically or statically on the display(s) 165.

The control node 102 can cause one or more of the displays 165 to display such content in response to a user selecting one or more display options. For example, selectable display options can include displaying the content of each tab in a separate display 165, displaying the content of an identified tab in multiple displays 165, displaying different portions of the content of an identified tab in different displays 165 (e.g., allowing the content of an identified tab to be positioned such that a first portion of the content is displayed by a first display 165, a second portion of the content is displayed by a second display 165, a third portion of the content is displayed by a third display 165, etc.), displaying the content of two or more identified tabs in the same display 165, and/or any combination thereof. Thus, the display options can allow a user to display any combination of selected and/or unselected tabs on any combination of displays 165. Possible display options are described in greater detail below with respect to FIGS. 3-5.

Optionally, content of open tabs, whether in active or inactive, can be viewable on any combination of the display 175 and the display(s) 165. For example, the control node 102 can cause simultaneously the display 175 to display the content of one or more tabs and one or more displays 165 to display content of one or more tabs. The display 175 and the display(s) 165 can display content of the same tabs, of different tabs, or any combination thereof. Whether the content of a tab is displayed on the display 175 or the display(s) 165, the user can, via the multi-active browser application 104, resize or reposition the content of a tab independent of the size, position, or number of content of other tabs (e.g., how tab content is resized or repositioned is not dependent on the size, position, or number of other tab content displayed on the display 175 or the display(s) 165, and resizing or repositioning tab content does not affect the size or position of other tab content displayed on the display 175 or the display(s) 165).

The control node 102 (e.g., the multi-active browser application 104) can further be in communication with a content delivery network 120 via the network 110 to retrieve the content associated with the various multi-active browser application 104 tabs. For example, the content delivery network 120 can store various content resources (e.g., content page source code, images, videos, documents, etc.) and/or be in communication with an origin server (not shown) at which original copies of the content resources can be stored. A user can open a tab in the multi-active browser application 104 and enter a network address and/or domain name. In response, the multi-active browser application 104 can communicate with the content delivery network 120 to retrieve content resources corresponding to the entered network address and/or domain name. The control node 102 (e.g., the multi-active browser application 104) can then send, in response to the selection of appropriate display option(s), streams of data to one or more of the display nodes 106A-106N to cause content of one or more tabs to be displayed. The operations performed by the control node 102 to send data streams to the display nodes 106A-106N are described in greater detail in U.S. Pat. No. 8,797,233, entitled "SYSTEMS, METHODS, AND DEVICES FOR DYNAMIC MANAGEMENT OF DATA STREAMS UPDATING DISPLAYS" ("the '233 patent"), which is hereby incorporated by reference herein in its entirety.

While FIG. 1A depicts a single content delivery network 120, this is not meant to be limiting. Any number of content delivery networks can be present in the environment 100, and the control node 102 can communicate with any one of these content delivery networks to retrieve content resources corresponding to network addresses and/or domain names entered by a user.

The control node 102 can retrieve content resources from the content delivery network 120 at a native resolution. For example, if a user is attempting to view a high resolution map (e.g., a map with over 200 million pixels, over 1 billion pixels, etc.), the control node 102 can retrieve an image of the map that has not been compressed, formatted, and/or otherwise modified to include fewer pixels. Optionally, the multi-active browser application 104 can resize the image to fit within the multi-active browser application 104 window. Thus, the display 175 can show a resized version of the image if a tab associated with the image is active. However, if a user selects a display option to display the tab corresponding to the map image on one or more displays 165, the multi-active browser application 104 can cause the display(s) 165 to display the image at a native resolution (e.g., an original sized version of the image rather than a resized version of the image), regardless of the individual or collective screen resolution(s) of the display(s) 165. Thus, the hardware limitations of the displays 165 do not restrict a user's ability to view content at an original size and/or resolution.

Any of the display nodes 106A-106N, the display 175, and/or the control node 102 can be used to implement certain systems and methods described herein. For example, in some embodiments, one or more of the display nodes 106A-106N, the display 175, and/or the control node 102 can be configured to manage the display of information on a tiled display system. The functionality provided for in the components and modules of the display nodes 106A-106N, the display 175, and/or control node 102 can be combined into fewer components and modules or further separated into additional components and modules.

In some embodiments, the display node 106A can include, for example, a computing device, such as a personal computer that is IBM, Macintosh, or Linux/Unix compatible. In some embodiments, the computing device comprises a server, a desktop computer, a laptop computer, a tablet, a cell phone, a personal digital assistant, a kiosk, a smart watch, a set top box, an audio player, and/or the like.

With continued reference to FIG. 1A, although only exemplary components of the display node 106A are described in detail, it is to be understood that the descriptions of the display node 106A set forth herein also apply to the other nodes 106B-106N.

In some embodiments, the display node 106A can include a central processing unit ("CPU") or processing unit 135, which can include one or more microprocessors, graphics processors, digital signal processors, and/or the like. The display node 106A can further include a memory 155, such as random access memory ("RAM") for temporary storage of information and a read only memory ("ROM") for permanent storage of information, and a mass storage device 130, such as one or more hard drive, diskette, flash memory, and/or optical media storage device. Typically, the modules of the display node 106A are connected to the computer using a standards based bus system. In different embodiments, the standards based bus system could be Peripheral Component Interconnect (PCI), Microchannel, small computer system interface (SCSI), Industrial Standard Architecture (ISA) and Extended ISA (EISA) architectures, and/or the like.

The display node 106A can be controlled and coordinated by operating system software, such as WINDOWS 95, WINDOWS 98, WINDOWS NT, WINDOWS 2000, WINDOWS XP, WINDOWS VISTA, WINDOWS 7, WINDOWS 10, Linux, MAC OS, SunOS, Solaris, a real-time operating system (RTOS), a mobile operating system (e.g., ANDROID, iOS, etc.), and/or other compatible operating systems. In Macintosh systems, the operating system can be any available operating system, such as MAC OS X. In other embodiments, the display node 106A can be controlled by a proprietary operating system. The operating systems can control and schedule computer processes for execution, perform memory management, provide file system, networking, and I/O services, and provide a user interface, such as a graphical user interface ("GUI"), among other things.

The exemplary display node 106A can include one or more commonly available input/output (I/O) devices and interfaces 110, such as a keyboard, mouse, touchpad, and printer. In addition, display node 106A can include one or more displays 165, such as a monitor, that allows the visual presentation of data (e.g., the content of tabs) to a user. More particularly, a display 165 provides for the presentation of scientific data, GUIs, application software data, content pages, multimedia presentations, and/or the like. The display node 106A can also include one or more multimedia devices 140, such as speakers, video cards, graphics accelerators, microphones, and/or the like.

In some embodiments, the I/O devices and interfaces 145 can provide a communication interface to various external devices. The display node 106A can be coupled to a network 110. The network 110 communicates with various computing devices and/or other electronic devices via wired or wireless communication links. In some embodiments, the network 110 includes any wired network, wireless network, or combination thereof. For example, the network 110 can be a personal area network, local area network (LAN), wide area network (WAN), over-the-air broadcast network (e.g., for radio or television), cable network, satellite network, cellular telephone network, or combination thereof. As a further example, the network 110 can be a publicly accessible network of linked networks, possibly operated by various distinct parties, such as the Internet. In some embodiments, the network 110 can be a private or semi-private network, such as a corporate or university intranet. The network 110 can include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 can include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the embodiment of FIG. 1A, display node 106A optionally includes, or optionally can be coupled to via a network connection, a processed image data source 170, such as a database, that includes information about one or more images to display. The information supplied by the processed image data source 170 can include a full size or original image that was or will be preprocessed and stored in a hierarchical format that includes sub-images, with each sub-image being a reduced size version of the original image. For example, a reduced resolution sub-image can be generated from an original full resolution image by deleting rows and columns of the pixels of the original image at predetermined spacings, thereby generating a lower resolution version of the full image. Any other known technique can also be used. The processed image data source 170 can serve as a video image data source, as used in the description set forth herein.

In some embodiments, the largest sub-image can be the same size as the original image and/or include image content from the original image. For example, each sub-image can be stored as one or more blocks to allow rapid access to a particular part of the original image without having to access entire rows. Of note, this can allow display node 106A to fetch exactly the level of detail (sub-image) it requires and/or to quickly fetch the needed blocks that make up the image tile to be placed on display 165. In addition to the devices that are illustrated in FIG. 1A, display node 106A can be coupled to the content delivery network 120 through a bus or network 110.

In some embodiments, display node 106A can preprocess images and/or other content page content stored in the content delivery network 120 and/or provided by the control node 102, store the result in a hierarchical format in processed image data source 170, calculate the correct portion of original images to be displayed on a particular display node 106A-106N, and/or display the corresponding preprocessed image data. Thus, the processed image data source 170 can be used to reduce the amount of data that needs to be loaded in memory and support faster manipulation of images.

Of note, images and/or other content stored in the content delivery network 120 can be compressed or uncompressed images. In some embodiments, the processed image data source 170 can also be configured to receive a compressed image from the content delivery network 120 and/or the control node 102. Once received, display node 106A can decompress an original image and then preprocess the original image into a set of one or more images that are compressed or decompressed and store them in the processed image data source 170. Spatial identifiers can be used to identify various portions of the images to facilitate extraction of different regions of the original image.

With continued reference to FIG. 1A, in some embodiments the display node 106A can also include applications that can be executed by the processing unit 135. In some embodiments, the applications include the image processor 150 and image displayer 160, which are discussed in further detail below. These applications can include, by way of example, hardware and/or software components, such as software components, object-oriented software components, class components and task components, processes, functions, attributes, procedures, subroutines, segments of program code, drivers, firmware, microcode, circuitry, data, databases, data structures, tables, arrays, and/or variables.

In some of the embodiments described herein, the display node 106A can be configured to execute instructions in the image processor 150, among others, in order to support user interactivity by reducing the amount of data loaded into memory when an image and/or other content page content is to be displayed on the display 165 and/or in a tiled display system. In addition, image processor 150 can be configured to allow portions of several images to be resident on multiple displays 165, thus supporting display and manipulation of multiple images across multiple display nodes 106A-106N. For example, in some embodiments, an image can be tens of billions of pixels. Image processor 150 can preprocess and store in a hierarchical format multiple full size or original images by calculating the correct portion of the images to be displayed on a specific display 165 of a specific display node 106A-106N.

In certain embodiments, each original image can be stored in a hierarchical format that includes sub-images that can be reduced size or reduced resolution versions of the original image. In some embodiments, the largest sub-image can be the same size as the original image and/or include image content from the original image to support zoom in and/or out, for example. Image processor 150 can then store each sub-image of the original image as one or more blocks to allow rapid access to a particular part of the full size image without having to access entire rows or columns. This can advantageously allow a display node 106A that knows which portion of the original image is needed for its display 165 to fetch the level of detail needed, such as a sub-image, and/or to quickly fetch the needed blocks that make up the image tile.

Image processor 150 can be further configured to send requests to control node 102 for information about other display nodes (e.g., 106B, 106C, etc.) and/or vice versa. In some embodiments, messages can be exchanged between control node 102 and/or other display nodes 106A-106N that include information about the state of a tiled display system, or a particular display node 106A-106N. The image processor 150 and/or the control node 102 can communicate the messages using a web service or using proprietary protocols.

Display node 106A can also execute instructions in image displayer 160 to display one or more images or portions thereof and/or manipulate the images. As noted above, an original image that is full size (e.g., at a native resolution) can be preprocessed by image processor 150 and then stored in processed image data source 170. Because the amount of data loaded into memory 155 can be reduced when an original image is stored in hierarchical format, image displayer 160 can enable a highly interactive display space that spans multiple display nodes 106A-106N.

For example, image displayer 160 can load the appropriate sub-image of an original image in memory 155 and on display 165. In some embodiments, surrounding blocks and blocks from higher and/or lower levels can also be pre-fetched for higher performance by image displayer 160. This can allow each display node 106A-106N to support the display of more than one such image or portions thereof. Additionally, a resource management approach can support interactivity by reducing the amount of data loaded and allowing portions of several images to be resident on each tile in a tiled display system (e.g., where each tile corresponds to a display 165, a portion of a display 165, or a set of displays 165), thus supporting display and manipulation of multiple big images.

Advantageously, image displayer 160 can be configured to allow the use of multiple highly detailed image data, which can exceed billions of pixels, to be displayed as part of a high resolution, coordinated workspace on a tiled display that includes multiple display nodes 106A-106N. Further, image displayer 160 allows in real-time or in near real-time interaction with multiple images by allowing moving, zooming, rotating, color filtering, and transparency controlling of images on display node(s) 106A-106N.

For example, in some embodiments, the user can use a front end interface, such as the multi-active browser application 104 running on the control node 102, and select to rotate, on a display 165 and/or tiled display system, an image depicted in a tab open in the multi-active browser application 104. Image displayer 160 can respond to the user's selection by using a reduced size or reduced resolution version of the original image, which can be stored in the processed image data source 170, to quickly adjust its display 165. For example, when the image is initially selected for rotation, the image displayer 160 can replace the image being displayed with the reduced size or reduced resolution version during the rotation process. Plus, as the reduced size or reduced resolution version of the original image is rotated and thus redrawn at different angular orientations, less processing power is required to complete the redraw process, thereby providing a quicker response time. After the rotation and redraw process is complete, the image displayer 160 can replace the reduced size or reduced resolution version of the original image with an original or full sized version of the original image for display on the display 165 and/or tiled display system such that the requested content is displayed at the native resolution.

In addition, image displayer 160 can also exchange messages with control node 102 or other display nodes 106A-106N about the state of a tiled display system, such as which portion of the original image are to be displayed by respective display nodes 106A-106N. Thus, image displayer 160 can provide a highly interactive experience that has numerous applications, including the manipulation of data about medical conditions, cancer cells, satellite images, geosciences, oil monitoring, weather monitoring or prediction, astronomy, video gaming, and/or the like that can be depicted in a content page.

Although FIG. 1A has been described with respect to display nodes 106A-106N, control node 102, display 175, and content delivery network 120, certain of the features of the environment 100 shown in FIG. 1A can be implemented using other types of computing devices communicating over the network 110. For example, the control node 102 can communicate over the network 110 with a media source device (instead of the content delivery network 120) and one or more destination computing devices (instead of the display nodes 106A-106N).

The control node 102 can broker a connection between the media source device and a destination computing device. In one embodiment, the control node 102 locates media data stored on the media source device and obtains the media data or a portion thereof (such as a thumbnail) from the media source device. The control node 102 can then send the media data or the portion thereof to the destination computing device, along with network communication or connectivity data. The network communication data can enable the destination computing device to communicate with the media source device to obtain media data. The network communication data could include, for example, a network address (such as an Internet protocol (IP) address) of the media source device, a proxy for the media source device, an anycast IP address for a plurality of media source devices, and/or the like.

Advantageously, in certain embodiments, providing the network communication data from the control node 102 to the destination computing device enables the destination computing device to obtain media, including media updates, from the media source device. As a result, the control node 102 can be less of a bottleneck for communications between the media source device and the destination computing device.

In an embodiment, the destination computing device can report or otherwise provide the media updates it receives or a portion thereof to the control node 102. For example, the destination computing device can provide a thumbnail, a reduced frame rate video, metadata associated with the media updates, combinations of the same, and/or the like. The control node 102 can therefore keep track of the media data provided to the destination control device.

In another embodiment, the control node 102 can provide network communication information to the media source device instead of or in addition to providing communication information to the destination computing device. This network communication information can allow the media source device to communicate with the destination computing device. For example, the control node 102 can provide a network address of the destination computing device to the media source device. The media source device can then push media to the destination computing device.

In still another embodiment, the control node 102 can identify media stored on the media computing device without requesting the media. The control node 102 can provide network communication data to the destination computing device, which allows the destination computing device to obtain the media from the media server. Thus, little or no media might pass through the control node 102 from the media source device to the destination computing device, further reducing bottleneck effects of the control node 102.

Figure 1B:
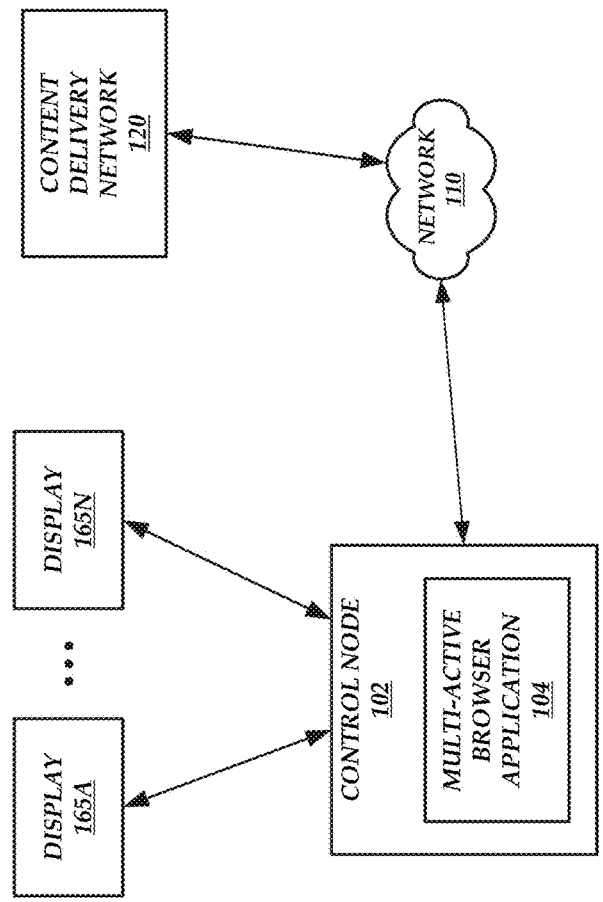
FIG. 1B is another block diagram illustrating an exemplary multi-active browsing environment in which a plurality of displays are in direct communication with the control node.

FIG. 1B is another block diagram illustrating an exemplary multi-active browsing environment 180 in which a plurality of displays 165A-165N are in direct communication with the control node 102. As illustrated in FIG. 1B, the display nodes 106A-106N are not present. Rather, the displays 165A-165N of the display nodes 106A-106N can be directly coupled to the control node 102, without any communications passing through the network 110.

The display 165A can act as a primary display and the remaining displays 165B-165N can act as secondary displays. Thus, the multi-active browser application 104 window can be displayed on the display 165A, and zero or more of the tabs open on the multi-active browser application 104 can be viewable on zero or more of the displays 165B-165N in a manner as described herein. For example, the multi-active browser application 104 can provide a user with display options to display any combination of active and/or inactive tabs on the display 165A within a single window of the multi-active browser application 104. As another example, the multi-active browser application 104 can provide a user with display options to display any combination of active and/or inactive tabs on any combination of the displays 165B-165N. As another example, the multi-active browser application 104 can provide a user with display options to display any combination of active and/or inactive tabs on any combination of the display 165A (e.g., within a single window of the multi-active browser application 104) and the displays 165B-165N. In any of the examples, a user can manipulate the size and position of the content of an active or inactive tab independent of the size, position, or number of the content of other tabs displayed on display(s) 165A-165N (e.g., how tab content is resized or repositioned is not dependent on the size, position, or number of other tab content displayed on display(s) 165A-165N, and resizing or repositioning tab content does not affect the size or position of other tab content displayed on display(s) 165A-165N).

In one embodiment, a user operating the control node 102 can be in position to view the display 165A. However, the displays 165B-165N can be visible or not be visible to the user. For example, some or all of the displays 165B-165N can face a direction away from the user, be in a different room than the user, etc. The embodiment of FIG. 1B is described in greater detail below with respect to FIG. 5.

While FIG. 1B depicts the display 165A as being external to the control node 102, this is not meant to be limiting. For example, the display 165A can be embedded within or otherwise comprised within the control node 102.

Example Displays of Multi-Active Browser Application Tab Content

Figure 2:
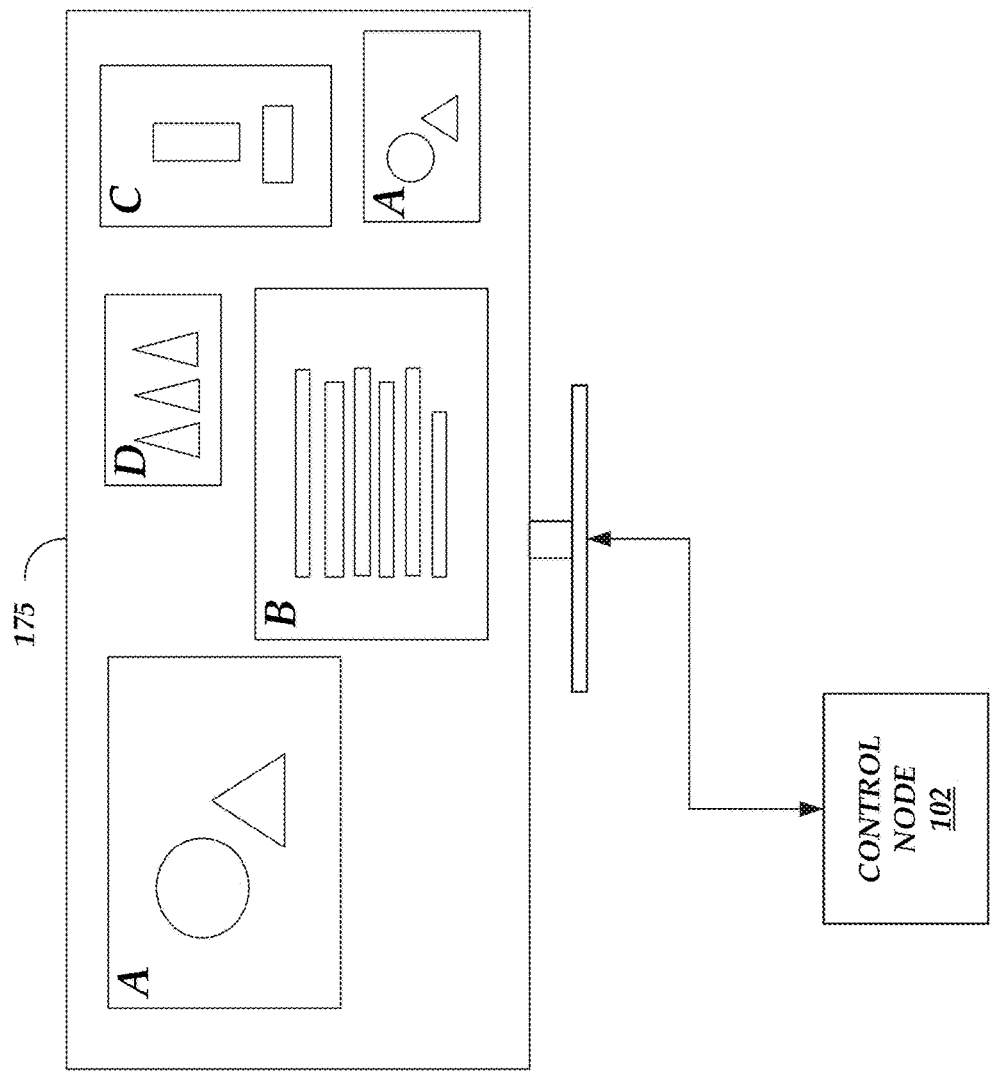
FIG. 2 is a block diagram of the operating environment of FIG. 1A illustrating an embodiment in which a display of FIG. 1A displays simultaneously the content of multiple tabs.

FIG. 2 is a block diagram of the operating environment 100 of FIG. 1A illustrating an embodiment in which display 175 displays simultaneously the content of multiple tabs. As illustrated in FIG. 2, the control node 102 is in communication with the display 175.

The multi-active browser application 104 can be running on the control node 102, and the control node 102 can cause the display 175 to display simultaneously the content of multiple tabs open in the multi-active browser application 104. For example, the multi-active browser application 104 can include four open tabs: tab A, tab B, tab C, and tab D. Each of tabs A, B, C, and D can be selectable via a selectable element (e.g., a rectangular box labeled "A," "B," "C", "D," etc.).

Here, a user has opted, via a display option provided by the multi-active browser application 104, to view two versions of the content of tab A, the content of tab B, the content of tab C, and the content of tab D on the display 175. As a result, the control node 102 causes the display 175 to display a first version of the content of tab A, a second version of the content of tab A, the content of tab B, the content of tab C, and the content of tab D at different positions. As illustrated in FIG. 2, the first version of the content of tab A has a larger size than the second version of the content of tab A. Thus, a single display 175 can display one or more versions of multiple tabs simultaneously.

The user, via the multi-active browser application 104, can resize or reposition any of the displayed content. For example, the user can enlarge the size of the content of a tab or reduce the size of the content of a tab. The user can also move or drag the content of a tab from one position within the display 175 to another position within the display 175. The resizing or repositioning of the content of a tab can be independent of the size, position, or number of the content of other tabs displayed on the display 175 (e.g., how tab content is resized or repositioned is not dependent on the size, position, or number of other tab content displayed on the display 175, and resizing or repositioning tab content does not affect the size or position of other tab content displayed on the display 175). Thus, for example, a user could resize and/or reposition the content of tab D to partially or fully overlap the content of tab B. In an embodiment, resizing or repositioning the content of one tab does not cause the size or position of another tab to change. Thus, resizing and/or repositioning the content of tab D to partially or fully overlap the content of tab B would not cause the content of tab B to be resized or repositioned.

In addition, if a user opens or closes a tab in the multi-active browser application 104, the action of opening or closing a tab would not cause the size or position of the content of the other tabs displayed on the display 175 to change unless at the direction of a user. For example, closing a tab in the multi-active browser application 104 can cause the content of the closed tab to disappear from view on the display 175. However, the content of other tabs still open in the multi-active browser application 104 would not be resized or repositioned on the display 175. Similarly, opening a new tab in the multi-active browser application 104 would not result in the content of other tabs displayed on the display 175 to be resized or repositioned unless at the request of the user.

Furthermore, any dynamically-changing content present within tabs A, B, C, and D can be displayed dynamically on the display 175. For example, for any tab A, B, C, and D that includes dynamically-changing content, the multi-active browser application 104 can play or show the dynamically-changing content. Thus, the control node 102 can cause the display 175 to play or show simultaneously the content of multiple tabs.

Figure 3:
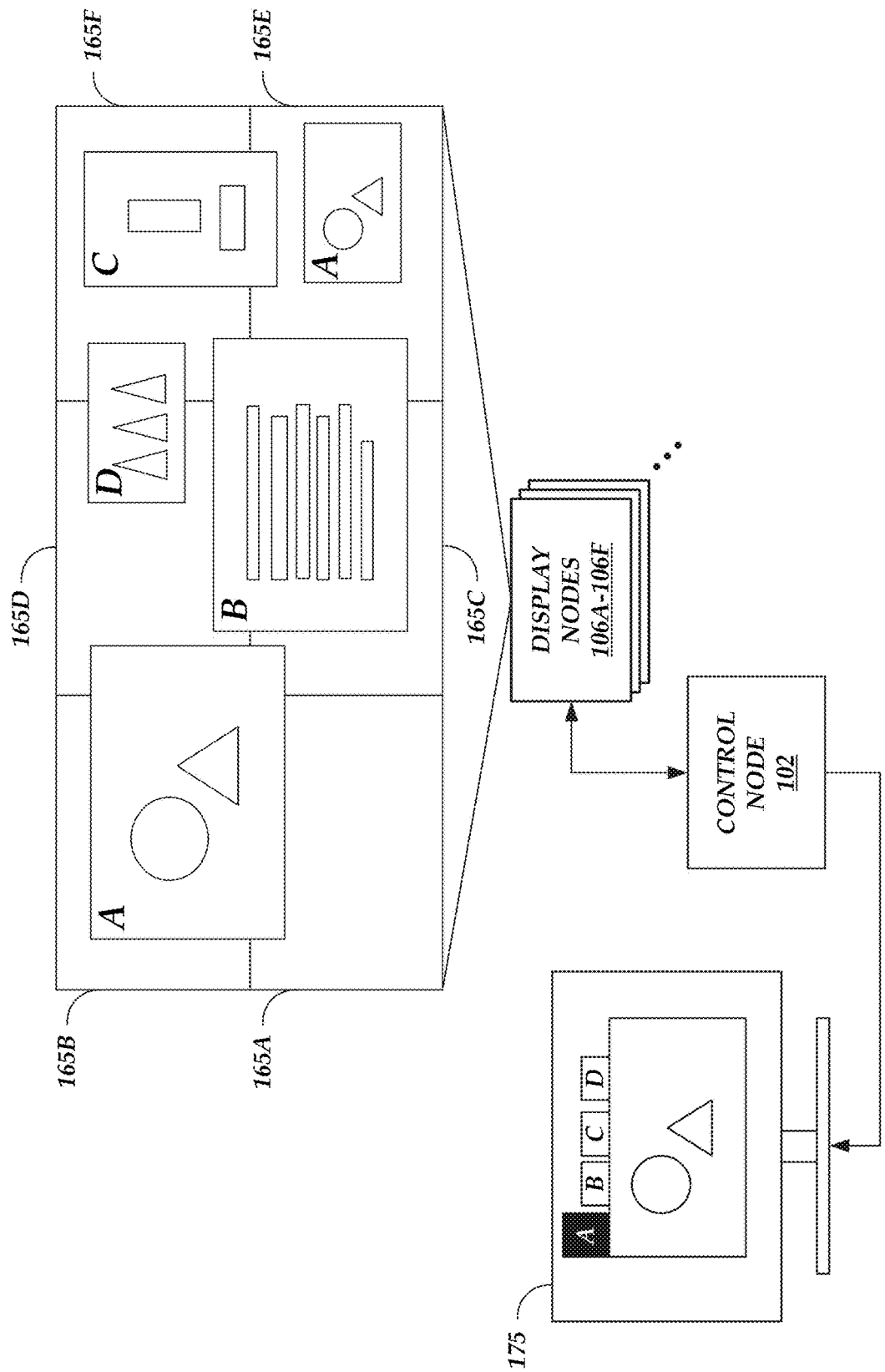
FIG. 3 is a block diagram of the operating environment of FIG. 1A illustrating an embodiment in which displays of display nodes of FIG. 1A form a tiled display system and display tab content.

FIG. 3 is a block diagram of the operating environment 100 of FIG. 1A illustrating an embodiment in which displays 165A-F of display nodes 106A-106F form a tiled display system and display tab content. As illustrated in FIG. 3, the control node 102 is in communication with the display 175 and the display nodes 106A-106F.

The multi-active browser application 104 can be running on the control node 102, and the control node 102 can cause the display 175 to display the multi-active browser application 104 window. For example, the multi-active browser application 104 window can include four open tabs: tab A, tab B, tab C, and tab D. Each of tabs A, B, C, and D can be selectable via a selectable element (e.g., a rectangular box labeled "A," "B," "C", "D," etc.). Here, tab A can be selected (e.g., active), and thus the content associated with tab A can be visible in the display 175. Tabs B, C, and D are not selected (e.g., inactive), and thus the content associated with these tabs are not visible in the display 175, hidden by the content associated with tab A.

However, a user can select one or more display options in the multi-active browser application 104 to cause the content of each tab A, B, C, and D to be displayed in the tiled display system. Specifically, displays 165A-165F can collectively display the content of tabs A, B, C, and D. The control node 102 can provide data streams including the tab content to the display nodes 106A-106F to enable the displays 165A-165F to display the tab content in a manner as described in the '233 patent.

For example, the selected display option(s) can result in a portion of display 165A displaying a first portion of the tab A content, a portion of display 165B displaying a second portion of the tab A content, a portion of display 165C displaying a third portion of the tab A content, another portion of display 165C displaying a first portion of the tab B content, a first portion of display 165D displaying a fourth portion of the tab A content, a second portion of display 165D displaying a second portion of the tab B content, a third portion of display 165D displaying a first portion of the tab D content, a first portion of display 165E displaying a third portion of the tab B content, a second portion of display 165E displaying a second copy of the tab A content, a third portion of display 165E displaying a first portion of the tab C content, a first portion of display 165F displaying a fourth portion of the tab B content, a second portion of display 165F displaying a second portion of the tab C content, and a third portion of display 165F displaying a second portion of the tab D content. While the selectable elements that allow a user to select tabs can be depicted in the display 175, the selectable elements are not depicted in the displays 165A-165F.

The displays 165A-165F, individually and/or collectively, can display some or all of the tab content at a native resolution of the respective content. For example, displays 165A-165D can collectively display the tab A content at a native resolution of the tab A content. The displays 165A-165F, individually and/or collectively, can also display resized versions of some or all of the tab content. For example, the display 165E can display a reduced size version of the tab A content. As another example, a display 165A-165F can display an enlarged size version of the tab A content.

The displayed content of tabs A, B, C, and/or D can be dynamic (e.g., rather than static, like an image or snapshot). For example, the content depicted in tabs A, B, C, and/or D can adjust, update, or otherwise change as would occur if the tabs A, B, C, and/or D were active tabs in the multi-active browser application 104. In particular, the content of multiple tabs A, B, C, and/or D can adjust, update, or otherwise change simultaneously. As an illustrative example, the tab D content includes three triangles. The three triangles can be depicted as a result of a video playing within the tab D. If the video, when played, depicts the triangles moving from one location to another, the displays 165D and/or 165F can depict a corresponding movement of the triangles within a portion of the displays 165D and/or 165F allocated to the tab D. Alternatively or in addition, the content of tabs A, B, C, and/or D can be static, such as an image or snapshot. For example, a user can select an option within the multi-active browser application 104 to toggle between the content of a tab being displayed as a dynamic version of the content or as a static version of the content.

As illustrated in FIG. 3, the content of a specific tab can be displayed fully by one display 165A-165F (e.g., the tab A content displayed in display 165E), can be displayed partially by multiple displays 165A-165F (e.g., different portions of the tab B content are displayed by displays 165C-165F), can be displayed fully by multiple displays 165A-165F (e.g., the tab A content is displayed fully by displays 165A-165D and fully by display 165E), and/or the like. In addition, the content of multiple tabs can be displayed partially or fully by one display 165A-165F.

A user, via the multi-active browser application 104, can control the appearance, position, and/or size of the tab content displayed within the tiled display system. The user can control the appearance, position, and/or size of the content of one tab independent of the appearance, position, and/or size of the content of other tabs displayed within the tiled display system (e.g., how tab content is resized or repositioned is not dependent on the size, position, or number of other tab content displayed within the tiled display system, and resizing or repositioning tab content does not affect the size or position of other tab content displayed within the tiled display system). For example, a user can select an option within the multi-active browser application 104 to display some or all of the tab content at a native resolution within the tiled display system, to display some or all of the tab content at a reduced and/or enlarged size within the tiled display system, to display some or all of the tab content at specific positions within the tiled display system, to display some or all of the tab content at specific angles of rotation within the tiled display system, to begin and/or cease displaying content of a specific tab within the tiled display system, etc. No matter which option(s) the user selects with respect to the content of one tab, the appearance, position, and/or size of the content of other tabs can remain the same. Thus, a user can opt to resize or reposition the content of one tab to partially or fully overlap (and therefore partially or fully hide) the content of other tabs displayed within the tiled display system.

If, for example, tab content changes (e.g., because the tab content is video content or an animation currently being played back by the multi-active browser application 104, because a user requests a new content page, etc.), the tab content displayed by the displays 165A-165F can update accordingly. As an illustrative example, the tab D content currently comprises three triangles. The three triangles can be content depicted on a content page requested by a user within the tab D. If the user requests a second content page within the tab D that depicts four squares, the control node 102 can retrieve the content (e.g., the four squares) from the content delivery network 120, and transmit one or more data streams including the retrieved content to one or more of the display nodes 106A-106N that instruct some or all of the display nodes 106A-106N to display the four squares in place of the three triangles at a position corresponding to the tab D (e.g., at a position overlapping the displays 165D and 165F).

Similarly, if a user closes a tab within the multi-active browser application 104 window, the control node 102 can instruct one or more of the display nodes 106A-106F to cease displaying the content associated with the closed tab. If a user opens a tab within the multi-active browser application 104 window, the control node 102 can instruct one or more of the display nodes 106A-106F to start displaying the content associated with the opened tab automatically after tab opening and/or after a user indicates that the content of the opened tab should be viewed on the tiled display system.

If a user opens or closes a tab in the multi-active browser application 104, the action of opening or closing a tab would not cause the size or position of the content of the other tabs displayed on the display 175 to change unless at the direction of a user. For example, closing a tab in the multi-active browser application 104 can cause the content of the closed tab to disappear from view on the display(s) 165A-165F. However, the content of other tabs still open in the multi-active browser application 104 would not be resized or repositioned on the display(s) 165A-165F. As an illustrative example, closing tab D would not necessarily result in the content of tabs A, B, or C being resized or repositioned within display(s) 165A-165F. Similarly, opening a new tab in the multi-active browser application 104 would not result in the content of other tabs displayed on the display(s) 165A-165F to be resized or repositioned unless at the request of the user. As an illustrative example, opening new tab E would not necessarily result in the content of tabs A, B, C, or D being resized or repositioned within display(s) 165A-165F.

Figure 4:
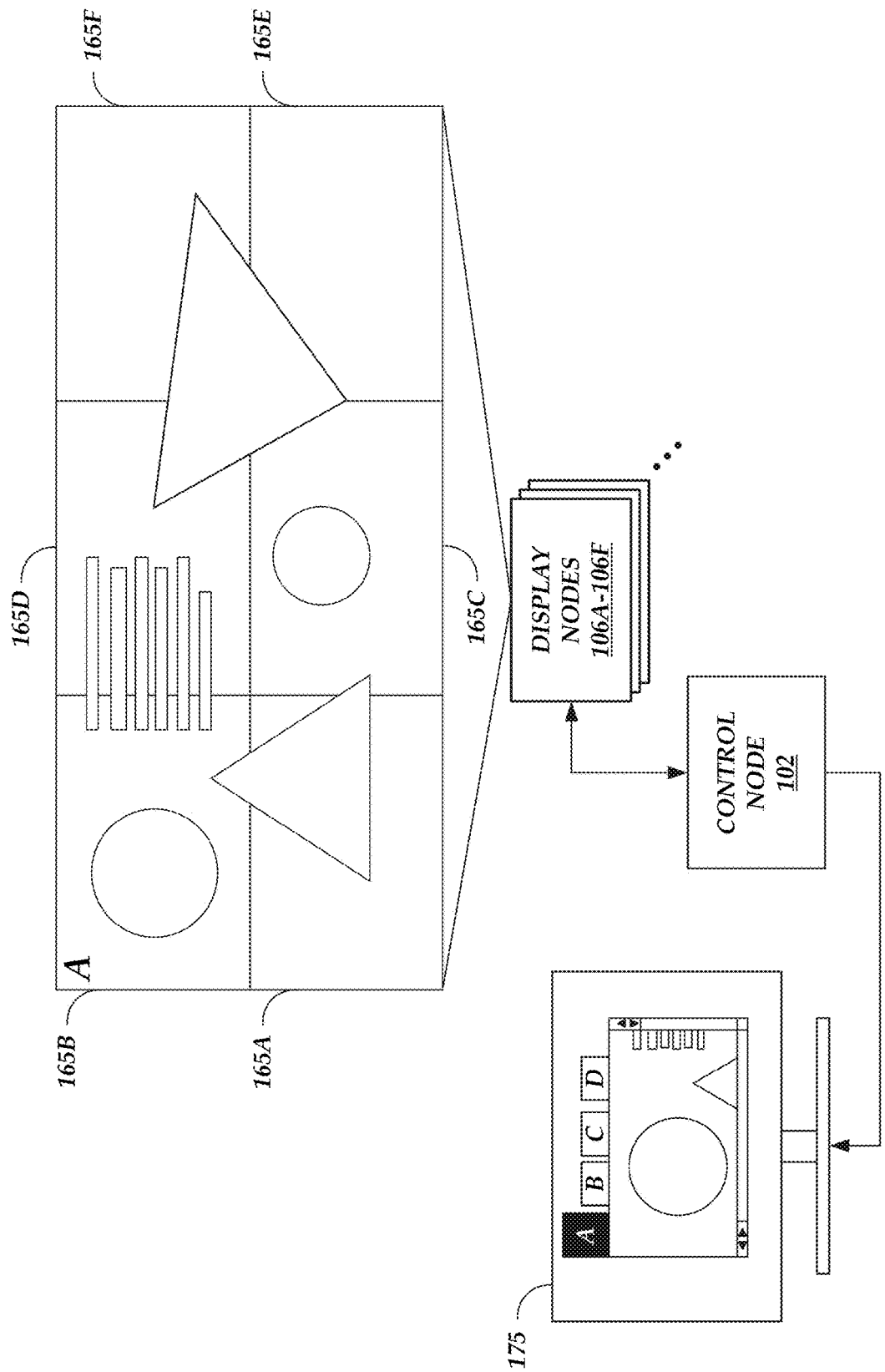
FIG. 4 is another block diagram of the operating environment of FIG. 1A illustrating an embodiment in which displays of display nodes of FIG. 1A form a tiled display system and display tab content.

FIG. 4 is another block diagram of the operating environment 100 of FIG. 1A illustrating an embodiment in which displays 165A-F of display nodes 106A-106F form a tiled display system and display tab content. As illustrated in FIG. 4, the control node 102 is in communication with the display 175 and the display nodes 106A-106F.

As described above with respect to FIG. 3, the multi-active browser application 104 can be running on the control node 102, and the control node 102 can cause the display 175 to display the multi-active browser application 104 window. For example, the multi-active browser application 104 window can include four open tabs: tab A, tab B, tab C, and tab D. Each of tabs A, B, C, and D can be selectable via a selectable element (e.g., a rectangular box labeled "A," "B," "C", "D," etc.). Here, tab A can be selected (e.g., active), and thus the content associated with tab A can be visible in the display 175. Tabs B, C, and D are not selected (e.g., inactive), and thus the content associated with these tabs are not visible in the display 175, hidden by the content associated with tab A.

Unlike FIG. 3, the user has not selected display option(s) that cause all of the tab content to be displayed in the tiled display system. Rather, the user has selected display option(s) such that the tab A content is displayed in the tiled display system at a native resolution. While the selectable elements that allow a user to select tabs can be depicted in the display 175, the selectable elements are not depicted in the tiled display system.

As illustrated in FIG. 4, the native resolution of the tab A content is higher than the screen resolution of the display 175. Thus, the multi-active browser application 104 window includes horizontal and/or vertical scroll bars to allow a user to scroll and view other portions of the tab A content that cannot immediately be viewed within the display 175. In fact, the native resolution of the tab A content can be higher than the individual screen resolutions of the displays 165A-165F and/or higher than the collective screen resolution of the tiled display system. Nonetheless, the control node 102 can transmit one or more data streams to one or more of the display nodes 106A-106N that includes the tab A content at a native resolution or full size. In response to receiving the data stream(s), the display node(s) 106A-106F can direct the displays 165A-165F to display collectively at least a portion of the tab A content at the native resolution or full size. For example, a portion of the tab A content can be off screen (e.g., not displayed by any of displays 165A-165F) given that the native resolution of the tab A content can be higher than the collective screen resolution of the tiled display system. A user, therefore, can view full size content regardless of the screen size limitations of the displays 165A-165F.

As described above with respect to FIG. 3, a user, via the multi-active browser application 104, can control the appearance, position, and/or size of the tab A content displayed within the tiled display system. In addition, if the tab A content changes (e.g., because the tab A content is video content or an animation currently being played back by the multi-active browser application 104, because a user requests a new content page, etc.), the tab A content displayed by the displays 165A-165F can update accordingly.

Similarly, if a user closes a tab within the multi-active browser application 104 window, the control node 102 can instruct one or more of the display nodes 106A-106F to cease displaying the content associated with the closed tab. If a user opens a tab within the multi-active browser application 104 window, the control node 102 can instruct one or more of the display nodes 106A-106F to start displaying the content associated with the opened tab automatically after tab opening and/or after a user indicates that the content of the opened tab should be viewed on the tiled display system.

While FIG. 4 illustrates an embodiment in which the tab A content is displayed by the displays 165A-165F at a native resolution or full size, this is not meant to be limiting. A user can select the content of any tab or group of tabs, whether active or inactive, to be displayed by the displays 165A-165F at a native resolution or full size, at an enlarged size, and/or at a reduced size. In an embodiment, if a group of tabs are selected to be displayed by the displays 165A-165F, any manipulation of the appearance, size, or position of the content of one tab will not affect the appearance, size, or position of the content of other tabs displayed by the displays 165A-165F. As described above, the content of any tab or group of tabs displayed by the displays 165A-165F can be a dynamic version of the content. Alternatively or in addition, the content of any tab or group of tabs displayed by the displays 165A-165F can be a static version of the content (e.g., an image, snapshot, etc.).

Figure 5:
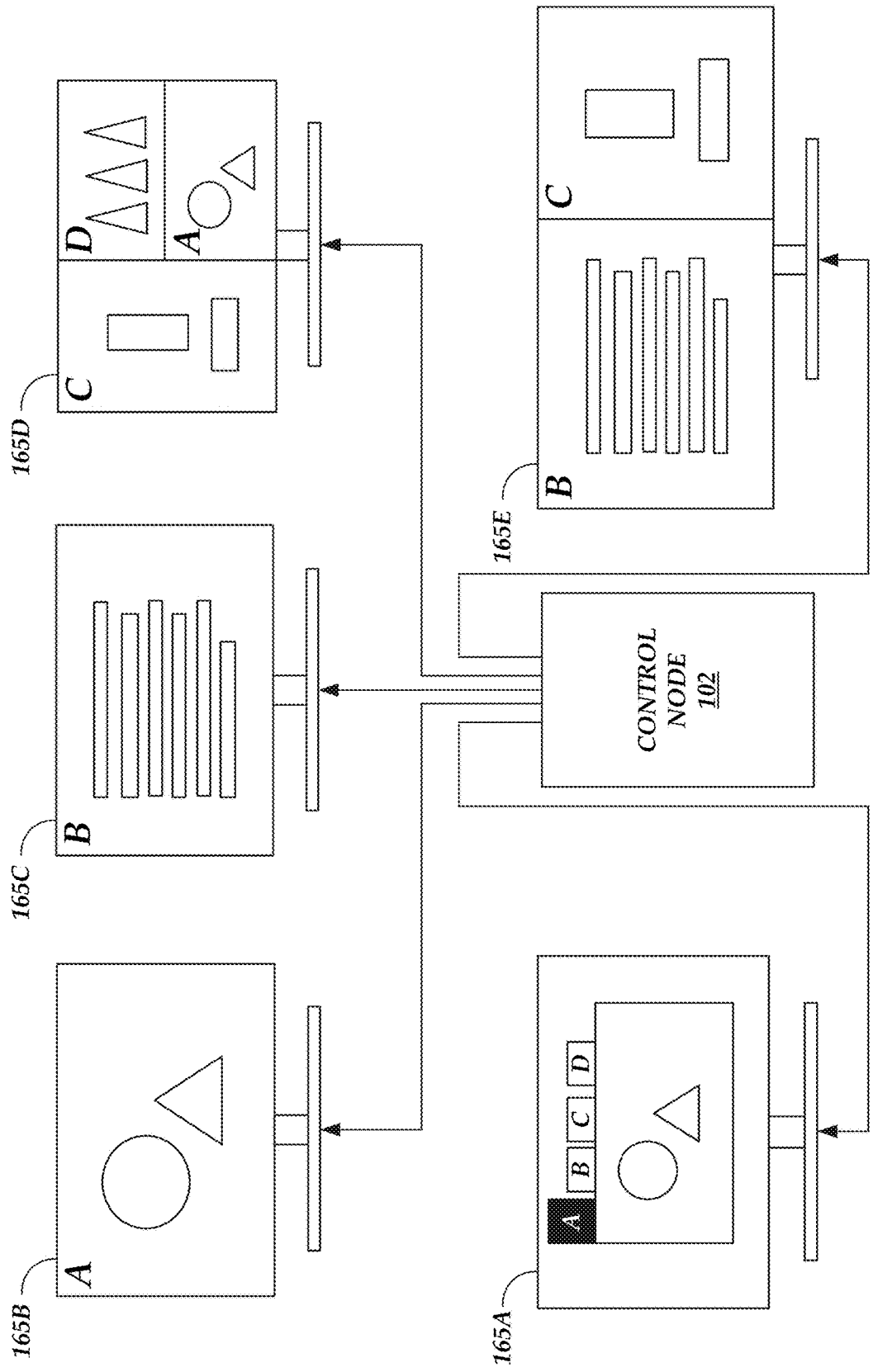
FIG. 5 is a block diagram of the operating environment of FIG. 1B illustrating an embodiment in which displays depict the content of various multi-active browser application tabs.

FIG. 5 is a block diagram of the operating environment 180 of FIG. 1B illustrating an embodiment in which displays 165A-F depict the content of various multi-active browser application 104 tabs. As illustrated in FIG. 5, the control node 102 is in communication with the displays 165A-165E.

The multi-active browser application 104 can be running on the control node 102, and the control node 102 can cause the display 165A to display the multi-active browser application 104 window. For example, the multi-active browser application 104 window can include four open tabs: tab A, tab B, tab C, and tab D. Each of tabs A, B, C, and D can be selectable via a selectable element (e.g., a rectangular box labeled "A," "B," "C," "D," etc.). Here, tab A can be selected (e.g., active), and thus the content associated with tab A can be visible in the display 165A. Tabs B, C, and D are not selected (e.g., inactive), and thus the content associated with these tabs are not visible in the display 165A, hidden by the content associated with tab A.

However, a user can select one or more display options in the multi-active browser application 104 to cause the content of each tab A, B, C, and D to be displayed in one or more of the displays 165B-165E. The control node 102 can provide data streams including the tab content to the displays 165B-165E such that the tab content is displayed.

For example, the selected display option(s) can result in display 165B displaying the tab A content; display 165C displaying the tab B content; display 165D displaying the tab A content, the tab C content, and the tab D content simultaneously; and display 165E displaying the tab B content and the tab C content simultaneously. While the selectable elements that allow a user to select tabs can be depicted in the display 165A, the selectable elements are not depicted in the displays 165B-165E.

The displays 165B-165E each can display the tab content at a native resolution of the respective content, at an enlarged size, and/or at a reduced size (where the reduced size can be smaller than, equal to, or larger than the size of a thumbnail, snapshot, or other type of preview). For example, display 165B can display the tab A content at a native resolution of the tab A content. Display 165D, on the other hand, can display the tab A content at a reduced size so that, for example, the content of tabs C and D can also be displayed. A user can select how tab content is resized and/or repositioned and/or the control node 102 can automatically resize and/or reposition the tab content based on the number of tabs and/or the size of content that a particular display 165B-165E is to display. For example, if a user selects to resize and/or reposition the content of one tab, the control node 102 can cause the display(s) 165B-165E to display the resized and/or repositioned tab content. However, the control node 102 can leave the content of other tabs unchanged such that the display(s) 165B-165E display the content of other tabs the same as before the resizing and/or repositioning occurred. In some embodiments, the control node 102 preserves the aspect ratio of the tab content when feasible (e.g., as long as other tab content to be displayed by a particular display 165B-165E can still be displayed). As described above, the content of any tab or group of tabs displayed by the displays 165A-165E can be a dynamic version of the content. Alternatively or in addition, the content of any tab or group of tabs displayed by the displays 165A-165F can be static version of the content (e.g., an image, snapshot, etc.).

A user, via the multi-active browser application 104, can control the appearance, position, and/or size of the tab content displayed by the displays 165B-165E. The user can control the appearance, position, and/or size of the content of one tab independent of the appearance, position, and/or size of the content of other tabs displayed by the displays 165B-165E (e.g., how tab content is resized or repositioned is not dependent on the size, position, or number of other tab content displayed by displays 165B-165E, and resizing or repositioning tab content does not affect the size or position of other tab content displayed by displays 165B-165E). For example, a user can select an option within the multi-active browser application 104 to display tab content at a native resolution within a display 165B-165E, to display tab content at a reduced and/or enlarged size within a display 165B-165E, to display tab content at specific positions within a display 165B-165E, to display tab content at specific angles of rotation within a display 165B-165E, to begin and/or cease displaying content of a specific tab within a display 165B-165E, etc. No matter which option(s) the user selects with respect to the content of one tab, the appearance, position, and/or size of the content of other tabs can remain the same. Thus, a user can opt to resize or reposition the content of one tab to partially or fully overlap (and therefore partially or fully hide) the content of other tabs displayed by displays 165B-165E.

Similarly, if a user closes a tab within the multi-active browser application 104 window, the control node 102 can instruct the appropriate display(s) 165B-165E (e.g., the display(s) 165B-165E initially depicting content of the now-closed tab) to cease displaying the content associated with the closed tab. If a user opens a tab within the multi-active browser application 104 window, the control node 102 can instruct one or more of the displays 165B-165E to start displaying the content associated with the opened tab automatically after tab opening and/or after a user indicates that the content of the opened tab should be viewed on one or more of the displays 165B-165E.

If a user opens or closes a tab in the multi-active browser application 104, the action of opening or closing a tab would not cause the size or position of the content of the other tabs displayed on the display 175 to change unless at the direction of a user. For example, closing a tab in the multi-active browser application 104 can cause the content of the closed tab to disappear from view on the display(s) 165B-165E. However, the content of other tabs still open in the multi-active browser application 104 would not be resized or repositioned on the display(s) 165B-165E. As an illustrative example, closing tab D would not necessarily result in the content of tabs A, B, or C being resized or repositioned within display(s) 165B-165E. Similarly, opening a new tab in the multi-active browser application 104 would not result in the content of other tabs displayed on the display(s) 165B-165E to be resized or repositioned unless at the request of the user. As an illustrative example, opening new tab E would not necessarily result in the content of tabs A, B, C, or D being resized or repositioned within display(s) 165B-165E.

As illustrated in FIG. 5, the content of a specific tab can be displayed fully by one display 165B-165E (e.g., the tab A content displayed by display 165B), the content of multiple tabs can be displayed fully by one display 165B-165E (e.g., the tab B content and the tab C content displayed by display 165E), the content of a specific tab can be displayed fully by multiple displays 165B-165E (e.g., the tab A content displayed by displays 165B and 165D), and/or the like. While not depicted in FIG. 5, the content of a specific tab can also be displayed partially by multiple displays 165B-165E (e.g., different portions of tab content can be displayed by displays 165B-165E).

In addition, if tab content changes (e.g., because the tab content is video content or an animation currently being played back by the multi-active browser application 104, because a user requests a new content page, etc.), the tab content displayed by the displays 165B-165E can update accordingly. If a display 165B-165E displays content of multiple tabs, just the portion of the display 165B-165E corresponding to a tab in which content has changed can be updated.

Example Multi-Active Browser Application Tab Content Viewing Methods

Figure 6:
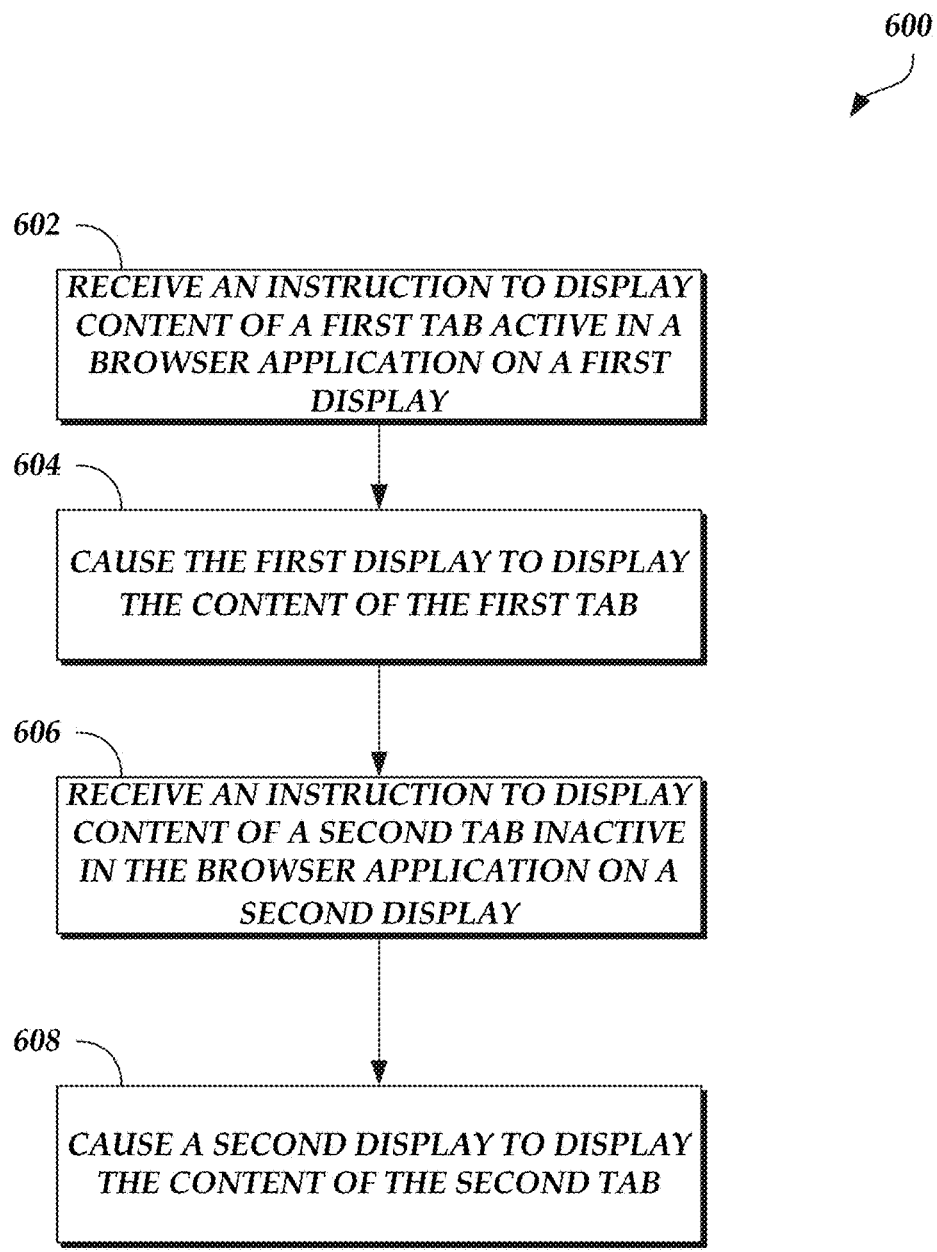
FIG. 6 is a flow diagram depicting a method for displaying tab content on secondary displays, according to one embodiment.

FIG. 6 is a flow diagram depicting a method 600 for displaying tab content on secondary displays, according to one embodiment. As an example, the method 600 can be implemented by the control node 102 (e.g., the multi-active browser application 104) of FIGS. 1A-1B.

At block 602, an instruction to display content of a first tab active in a browser application on a first display is received. For example, the browser application (e.g., the multi-active browser application 104) can be running on the control node 102, and the browser application window can be viewable on a primary display. The browser application can include several tabs, with the first tab being active. Thus, the content of the first tab can be viewable on the primary display, but the content of the other tabs are not viewable on the primary display (e.g., because the content of the first tab hides, covers, or otherwise overlays the content of the other tabs).

At block 604, the first display is caused to display the content of the first tab. For example, the control node 102 can transmit a data stream to the first display (or a display node 106 that includes the first display) that includes the content of the first tab. The first display can be different than the primary display. In response, the first display (or the display node 106 that includes the first display) can use the contents of the data stream to display the content of the first tab on the first display.

At block 606, an instruction to display content of a second tab inactive in the browser application on a second display is received. For example, the content of the second tab is not viewable in the primary display depicting the browser application window because the first tab is active and the first tab content is showing. The second display can be different than the primary display. The first display and the second display can be arranged together to form at least a portion of a tiled display system. Alternatively, the first display and the second display can have no relationship other than being coupled directly or indirectly to the control node 102.

At block 608, a second display is caused to display the content of the second tab. For example, the control node 102 can transmit a data stream to the second display (or a display node 106 that includes the second display) that includes the content of the second tab. In response, the second display (or the display node 106 that includes the second display) can use the contents of the data stream to display the content of the second tab on the second display. Thus, the content of the second tab is viewable on a secondary display even though the second tab is inactive and the second tab content is not viewable on the primary display.

Figure 7:
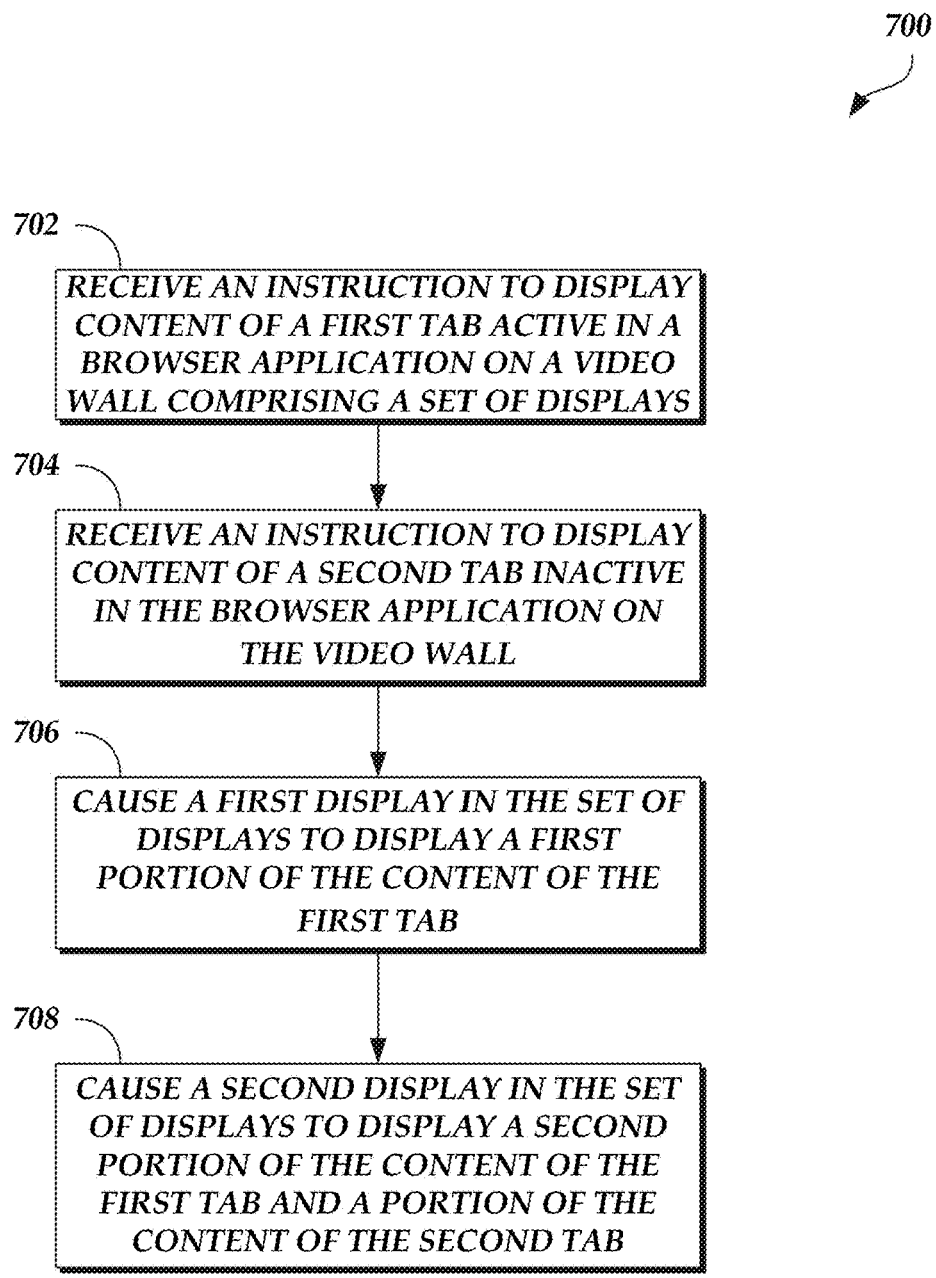
FIG. 7 is a flow diagram depicting a method for displaying tab content on a tiled display system, according to one embodiment.

FIG. 7 is a flow diagram depicting a method 700 for displaying tab content on a tiled display system, according to one embodiment. As an example, the method 700 can be implemented by the control node 102 (e.g., the multi-active browser application 104) of FIG. 1A.

At block 702, an instruction to display content of a first tab active in a browser application on a video wall comprising a set of displays is received. For example, the browser application (e.g., the multi-active browser application 104) can be running on the control node 102, and the browser application window can be viewable on a primary display. The browser application can include several tabs, with the first tab being active. Thus, the content of the first tab can be viewable on the primary display, but the content of the other tabs is not viewable on the primary display (e.g., because the content of the first tab hides, covers, or otherwise overlays the content of the other tabs). The video wall can be a tiled display system separate from the primary display in which the set of displays are arranged such that the displays are tiled together contiguously and/or in an overlapping manner.

At block 704, an instruction to display content of a second tab inactive in the browser application on the video wall is received. For example, the content of the second tab is not viewable in the primary display depicting the browser application window because the first tab is active and the first tab content is showing. The instruction received at block 704 and/or the instruction received at block 702 can indicate which portion of the video wall is to display the content of the first tab and/or the content of the second tab, the size at which the content of the first tab and/or the content of the second tab should be displayed, and/or other indications of how the content of the first tab and/or the content of the second tab should appear when displayed in the video wall.

At block 706, a first display in the set of displays is caused to display a first portion of the content of the first tab. For example, the control node 102 can transmit a data stream to one or more displays nodes 106 that include displays that form the video wall, such as to the display node 106 that includes the first display, where the data stream includes at least some of the content of the first tab. In response, the display node 106 that includes the first display can use the contents of the data stream to display the first portion of the content of the first tab on the first display.

At block 708, a second display in the set of displays is caused to display a second portion of the content of the first tab and a portion of the content of the second tab. For example, the control node 102 can transmit a data stream to the one or more display nodes 106 that include displays that form the video wall, such as to the display node 106 that include the second display, where the data stream includes at least some of the content of the first tab and at least some of the content of the second tab. In response, the display node 106 that include the second display can use the contents of the data stream to display the second portion of the content of the first tab and the portion of the content of the second tab. Thus, at least some of the content of the second tab is viewable on a secondary display even though the second tab is inactive and the second tab content is not viewable on the primary display.

Figure 8:
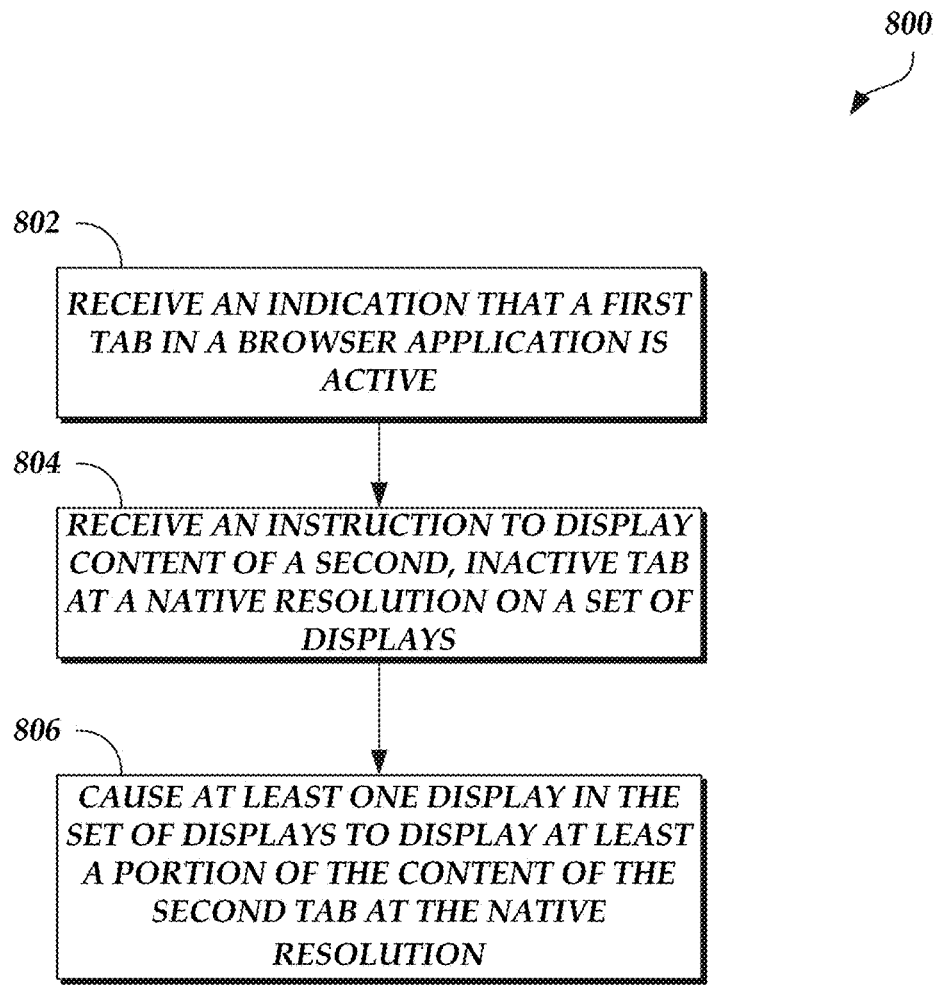
FIG. 8 is a flow diagram depicting a method for displaying tab content at a native resolution on a tiled display system, according to one embodiment.

FIG. 8 is a flow diagram depicting a method 800 for displaying tab content at a native resolution on a tiled display system, according to one embodiment. As an example, the method 800 can be implemented by the control node 102 (e.g., the multi-active browser application 104) of FIG. 1A.

At block 802, an indication that a first tab in a browser application is active is received. For example, the browser application (e.g., the multi-active browser application 104) can be running on the control node 102, and the browser application window can be viewable on a primary display. The browser application can include several tabs, with the first tab being active. Thus, the content of the first tab can be viewable on the primary display, but the content of the other tabs is not viewable on the primary display (e.g., because the content of the first tab hides, covers, or otherwise overlays the content of the other tabs).

At block 804, an instruction is received to display content of a second, inactive tab at a native resolution on a set of displays. For example, the set of displays can form a tiled display system in which the set of displays are arranged such that the displays are tiled together contiguously and/or in an overlapping manner. The set of displays can be separate from the primary display. The content of the second tab is not viewable in the primary display depicting the browser application window because the first tab is active and the first tab content is showing.

At block 806, at least one display in the set of displays is caused to display at least a portion of the content of the second tab at the native resolution of the second tab content. For example, the control node 102 can transmit a data stream to one or more displays nodes 106 that include displays that form the tiled display system, where the data stream includes at least some of the content of the second tab. In response, the display node(s) 106 can use the contents of the data stream to display at least a portion of the content of the second tab on at least one display in the tiled display system. The at least portion of the content of the second tab can be displayed at the native resolution of the second tab content regardless of the screen resolution limitations of the display(s) of the tiled display system. Thus, at least some of the content of the second tab is viewable on at least one secondary display even though the second tab is inactive and the second tab content is not viewable on the primary display and even though the resolution of the second tab content can be higher than the collective screen resolution of the tiled display system.

Figure 9:
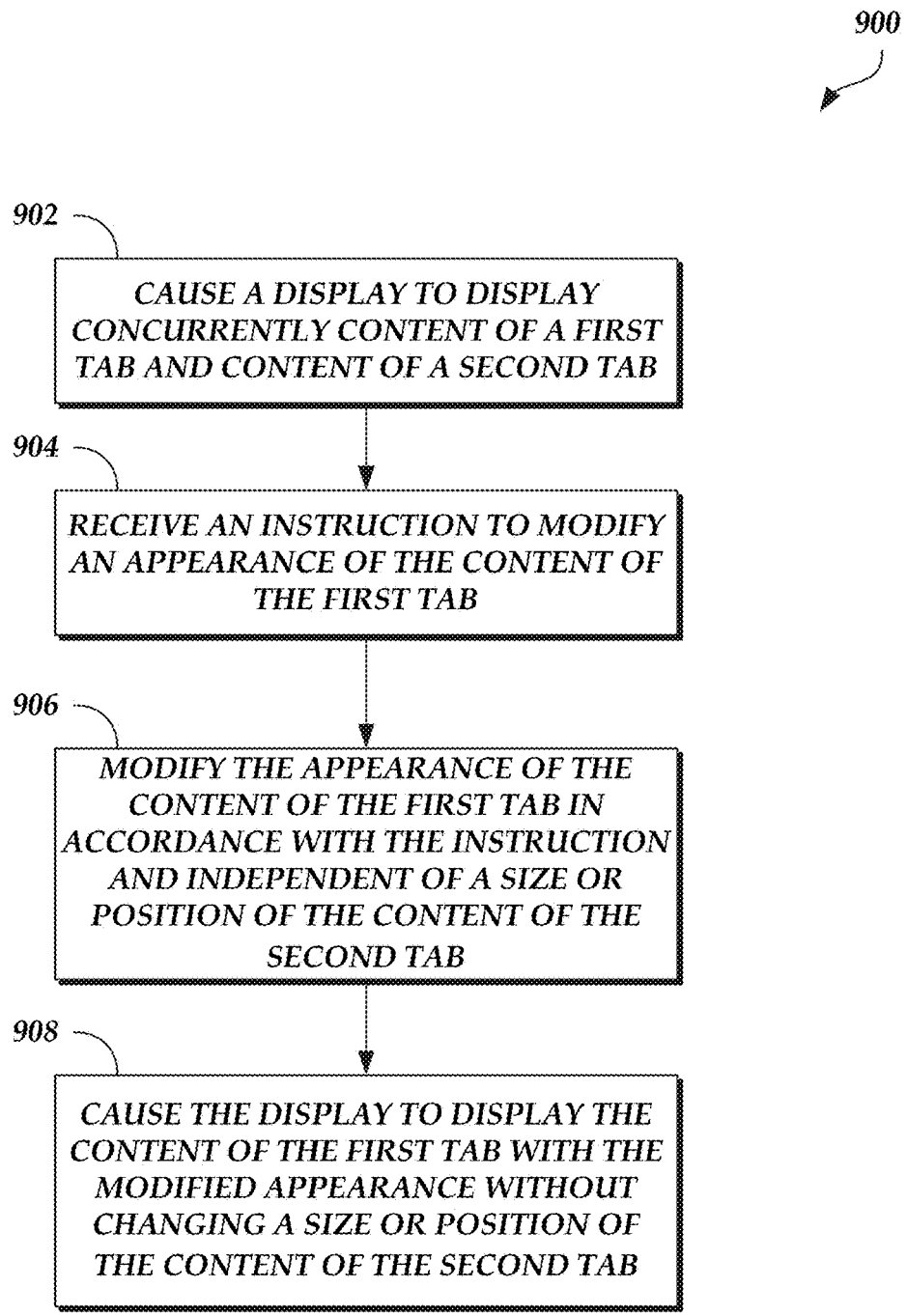
FIG. 9 is a flow diagram depicting a method for displaying simultaneously content of multiple tabs on a single display, according to one embodiment.

FIG. 9 is a flow diagram depicting a method 900 for displaying simultaneously content of multiple tabs on a single display, according to one embodiment. As an example, the method 900 can be implemented by the control node 102 (e.g., the multi-active browser application 104) of FIG. 1A.

At block 902, a display is caused to display concurrently content of a first tab and content of a second tab. For example, the first tab and the second tab can be open in the multi-active browser application. The display can display the content of the first tab and the content of the second tab at different positions such that the content of each tab is visible.

At block 904, an instruction is receive to modify an appearance of the content of the first tab. For example, the instruction may be to resize or reposition the content of the first tab.

At block 906, the appearance of the content of the first tab is modified in accordance with the instruction and independent of a size or position of the content of the second tab. For example, how the content of the first tab is modified is not dependent on the size or position of the content of the second tab or the number of other tabs that are displayed on the display, and modifying an appearance of the content of the first tab does not affect the size or position of the content of the second tab.

At block 908, the display is caused to display the content of the first tab with the modified appearance without changing a size or position of the content of the second tab. Thus, depending on what instruction was provided, the content of the first tab with the modified appearance can partially or fully overlap (and therefore partially or fully hide) the content of the second tab as displayed on the display.

Terminology

All of the methods and tasks described herein can be performed and fully automated by a computer system. The computer system can, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein can be embodied in such program instructions, or can be implemented in application-specific circuitry (e.g., ASICs or FPGAs) of the computer system. Where the computer system includes multiple computing devices, these devices can, but need not, be co-located. The results of the disclosed methods and tasks can be persistently stored by transforming physical storage devices, such as solid state memory chips or magnetic disks, into a different state. In some embodiments, the computer system can be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device can also include primarily analog components. For example, some or all of the rendering techniques described herein can be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   executing an application running on a user device, wherein the application is displayed on a primary display coupled to the user device, and wherein the application comprises a first tab and a second tab;
   receiving, by the user device via the application displayed on the primary display, a first request to open the first tab in the application;
   causing, by the user device, a first standalone display coupled to the user device separate from the primary display to display content of the first tab, wherein content of the first tab comprises first non-static content;
   receiving, by the user device via the application displayed on the primary display, a second request to open the second tab in the application displayed on the primary display;
   without a user selection of the first tab or the second tab in the application displayed on the primary display, causing, by the user device, the first standalone display to display and play second non-static content of the second tab simultaneously with the first non-static content of the first tab, the second non-static content of the second tab displayed at a first size and at a first position, wherein the first non-static content of the first tab and the second non-static content of the second tab are hidden from view in the primary display; and
   causing, by the user device, the first standalone display to display a first portion of the second non-static content of the second tab concurrently with a second standalone display displaying a second portion of the second non-static content of the second tab.

2. The computer-implemented method of claim 1, wherein the content of the first tab at least partially overlaps the content of the second tab at the first size and at the first position.

3. The computer-implemented method of claim 1, wherein the first standalone display displays a dynamic version of the content of the first tab concurrently with a dynamic version of the content of the second tab.

4. The computer-implemented method of claim 1, further comprising causing, by the user device, the second standalone display to display at least a portion of the content of the second tab concurrently with the first standalone display displaying concurrently the content of the first tab and the content of the second tab at the first size and at the first position.

5. The computer-implemented method of claim 4, wherein the first standalone display and the second standalone display are positioned one of adjacent to each other in a video wall or non-adjacent to each other in the video wall.

6. The computer-implemented method of claim 4, wherein the first standalone display is positioned within a first room, and wherein the second standalone display is positioned within a second room different than the first room.

7. The computer-implemented method of claim 4, wherein the primary display, the first standalone display, and the second standalone display are physically connected to the user device.

8. The computer-implemented method of claim 1, wherein the first tab is active in the application such that the content of the first tab is visible in the primary display, and wherein the second tab is inactive in the application such that the content of the second tab is hidden from view in the primary display.

9. The computer-implemented method of claim 1, further comprising:
receiving, by the user device, an instruction to display content of a third tab open in the application on the second standalone display, wherein the third tab is inactive in the application such that the content of the third tab is hidden from view in the primary display; and
causing, by the user device, the second standalone display to display the content of the third tab concurrently with the first standalone display displaying concurrently the content of the first tab and the content of the second tab at the first size and at the first position.

10. The computer-implemented method of claim 9, further comprising:
in response to reception of a second instruction to move at least a portion of the content of the third tab from the second standalone display to the first standalone display,
moving the content of the third tab in accordance with the second instruction and independent of a size or position of the content of the first tab and a size or position of the content of the second tab, and
causing the first standalone display to display concurrently the content of the first tab, the content of the second tab at the first size and at the first position, and at least the portion of the content of the third tab.

11. The computer-implemented method of claim 1, wherein the application displayed in the primary display comprises a selectable element corresponding to the first tab and a selectable element corresponding to the second tab, and wherein the first standalone display does not display the selectable element corresponding to the first tab.

12. A system comprising:
a primary display; and
a control node comprising a processor and computer-executable instructions, wherein the computer-executable instructions, when executed, cause the control node to:
execute an application, wherein the application is displayed on the primary display, and wherein the application comprises a first tab and a second tab;
process a first request from the control node via the application displayed on the primary display to open the first tab in the application;
cause, by the control node, a first standalone display to display content of the first tab, wherein content of the first tab comprises first non-static content;
process a second request from the control node via the application displayed on the primary display to open the second tab in the application;
without a user selection of the first tab or the second tab in the application displayed on the primary display, cause, by the control node, the first standalone display to display and play second non-static content of the second tab simultaneously with the first non-static content of the first tab, the second non-static content of the second tab displayed at a first size and at a first position, wherein the first non-static content of the first tab and the second non-static content of the second tab are hidden from view in the primary display; and
cause, by the control node, the first standalone display to display a first portion of the second non-static content of the second tab concurrently with a second standalone display displaying a second portion of the second non-static content of the second tab.

13. The system of claim 12, wherein the content of the first tab at least partially overlaps the content of the second tab at the first size and at the first position.

14. The system of claim 12, wherein the first standalone display displays a dynamic version of the content of the first tab concurrently with a dynamic version of the content of the second tab.

15. The system of claim 12, wherein the control node comprises the primary display, and wherein the application is displayed on the primary display.

16. The system of claim 15, wherein the computer-executable instructions, when executed, further cause the control node to cause the second standalone display to display at least a portion of the content of the second tab concurrently with the first standalone display displaying concurrently the content of the first tab and the content of the second tab at the first size and at the first position.

17. Non-transitory, computer-readable storage media comprising computer-executable instructions, wherein the computer-executable instructions, when executed by a control node comprising physical hardware, cause the control node to perform operations comprising:
executing an application, wherein the application is displayed on a primary display and, wherein the application comprises a first tab and a second tab;
processing a first request from the control node via the application displayed on the primary display to open the first tab in the application;
causing, by the control node, a first standalone display to display content of the first tab, wherein content of the first tab comprises first non-static content;
processing a second request from the control node via the application displayed on the primary display to open the second tab in the application;

without a user selection of the first tab or the second tab in the application displayed on the primary display, causing, by the control node, the first standalone display to display and play the first non-static content of the first tab concurrently with second non-static content of the second tab, the second non-static content of the second tab displayed at a first size and at a first position, wherein the first non-static content of the first tab and the second non-static content of the second tab are hidden from view in the primary display; and causing, by the control node, the first standalone display to display a first portion of the second non-static content of the second tab concurrently with a second standalone display displaying a second portion of the second non-static content of the second tab.

18. The non-transitory, computer-readable storage media of claim 17, wherein the first non-static content of the first tab at least partially overlaps the second non-static content of the second tab at the first size and at the first position.

19. The non-transitory, computer-readable storage media of claim 17, wherein the first standalone display displays a dynamic version of the first non-static content of the first tab concurrently with a dynamic version of the second non-static content of the second tab.

* * * * *